US012795710B2

(12) United States Patent
Kwon et al.

(10) Patent No.: US 12,795,710 B2
(45) Date of Patent: Nov. 10, 2026

(54) USER EQUIPMENT COMMUNICATING WITH BASE STATION BASED ON 5G MOBILE NETWORK AND OPERATING METHOD THEREOF

(71) Applicant: SAMSUNG ELECTRONICS CO., LTD., Suwon-si (KR)

(72) Inventors: Yangsoo Kwon, Seoul (KR); Jungmin Park, Seoul (KR); Kunil Yum, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1123 days.

(21) Appl. No.: 17/661,926

(22) Filed: May 4, 2022

(65) Prior Publication Data

US 2022/0361179 A1 Nov. 10, 2022

(30) Foreign Application Priority Data

May 7, 2021 (KR) ........................ 10-2021-0059512
Jul. 27, 2021 (KR) ........................ 10-2021-0098569

(51) Int. Cl.
*H04W 72/541* (2023.01)
*H04W 4/06* (2009.01)
(Continued)

(52) U.S. Cl.
CPC ........... *H04W 72/541* (2023.01); *H04W 4/06* (2013.01); *H04W 72/0446* (2013.01); *H04W 72/30* (2023.01)

(58) Field of Classification Search
CPC ............... H04W 72/541; H04W 72/30; H04W 72/0446
See application file for complete search history.

(56) References Cited

U.S. PATENT DOCUMENTS 10,813,116 B2 10/2020 Chatterjee et al.
10,820,269 B2 10/2020 Lu et al.
(Continued)

FOREIGN PATENT DOCUMENTS

CN 110753341 A 2/2020
CN 111149321 A 5/2020
(Continued)

OTHER PUBLICATIONS

Extended European Search Report dated Oct. 17, 2022 in corresponding European Patent Application No. 22170939.7, 10 pages.
(Continued)

*Primary Examiner* — Siming Liu
(74) *Attorney, Agent, or Firm* — Morgan, Lewis & Bockius LLP

(57) ABSTRACT

An operating method of a user equipment communicating with a base station based on a fifth-generation (5G) mobile network includes setting at least one value of at least one time parameter based on an activated function in the 5G mobile network; determining a processing time for a physical downlink shared channel (PDSCH) from the base station based on the at least one value; determining a capability of the user equipment by comparing the processing time with a reference time; and transmitting information including the capability of the user equipment to the first base station.

19 Claims, 30 Drawing Sheets

(51) Int. Cl.
*H04W 72/0446* (2023.01)
*H04W 72/30* (2023.01)

(56) References Cited

U.S. PATENT DOCUMENTS

| | | | |
|---|---|---|---|
| 10,993,195 | B2 | 4/2021 | Loehr et al. |
| 2018/0254797 | A1 | 9/2018 | Amini et al. |
| 2020/0413335 | A1 | 12/2020 | Lu et al. |
| 2021/0037468 | A1 | 2/2021 | Huang et al. |
| 2021/0058949 | A1 | 2/2021 | Kim et al. |
| 2021/0058953 | A1 | 2/2021 | Bendlin et al. |
| 2021/0058956 | A1 | 2/2021 | Chatterjee et al. |
| 2021/0067261 | A1 | 3/2021 | Shin et al. |
| 2021/0091880 | A1 | 3/2021 | Kim et al. |
| 2021/0092762 | A1 | 3/2021 | Choi et al. |
| 2021/0105217 | A1* | 4/2021 | Saber .................... H04W 72/51 |
| 2022/0124654 | A1* | 4/2022 | Takeda ................ H04W 72/121 |

FOREIGN PATENT DOCUMENTS

| | | | |
|---|---|---|---|
| CN | 112514471 | A | 3/2021 |
| WO | 2020/144778 | A1 | 7/2020 |

OTHER PUBLICATIONS

Samsung, "On Mechanisms to support group scheduling for RRC_ Connected UEs", 3GPP TSG RAN WG1 #103-e Meeting, R1-2008192, e-meeting, Oct. 26-Nov. 13, 2020, 4 pages.

3GPP, TS38.214 v15.12.0, (Mar. 2021) NR; Physical layer procedures for data.

First Office Action issued Feb. 12, 2026 in corresponding Korean Patent Application No. 10-2021-0098569.

First Office Action issued Jul. 31, 2026 in corresponding Chinese Patent Application No. 202210491787.0.

* cited by examiner

FIG. 6C

| | FIRST TIME PARAMETER | SECOND TIME PARAMETER |
|---|---|---|
| Value | X1 | Y1 |

FIG. 11A

| Overlap Width | 1st Time Parameter | 2nd Time Parameter |
|---|---|---|
| RG1 | X11 | Y11 |
| RG2 | X21 | Y21 |
| RG3 | X31 | Y31 |
| ⋮ | ⋮ | ⋮ |

FIG. 12C

| | THIRD TIME PARAMETER | FOURTH TIME PARAMETER |
|---|---|---|
| Value | X2 | Y2 |

FIG. 14B

| Slot Configuration | THIRD TIME PARAMETER | FOURTH TIME PARAMETER |
|---|---|---|
| CONFIG1 | X12 | Y12 |
| CONFIG2 | X22 | Y22 |
| CONFIG3 | X32 | Y32 |
| ⋮ | ⋮ | ⋮ |

USER EQUIPMENT COMMUNICATING WITH BASE STATION BASED ON 5G MOBILE NETWORK AND OPERATING METHOD THEREOF

CROSS-REFERENCE TO RELATED APPLICATIONS

This application is based on and claims priority under 35 U.S.C. § 119 to Korean Patent Application Nos. 10-2021-0059512, filed on May 7, 2021 and 10-2021-0098569, filed on Jul. 27, 2021, in the Korean Intellectual Property Office, the disclosures of which are incorporated by reference herein in their entireties.

TECHNICAL FIELD

This disclosure relates generally to wireless communications and more particularly to a user equipment (UE) communicating with a base station in a fifth-generation (5G) compatible mobile network, and an operating method thereof.

DISCUSSION OF THE RELATED ART

The 3rd Generation Partnership Project (3GPP) Release 17 prescribes standards and suggests newly added functions for the enhancement of 5G ("5G new radio (NR)") mobile network technology. The newly added functions, however, may result in higher processing times for a UE to process a physical downlink shared channel (PDSCH), and thereby cause unwanted delays. The PDSCH processing time of a UE is a factor determining the UE's capability, and such capability may be considered by a base station when determining whether or how to communicate with the UE.

SUMMARY

Embodiments of the inventive concept provide a user equipment for improving communication capability by determining a physical downlink shared channel (PDSCH) processing time thereof, taking into account functions newly added to fifth-generation (5G) mobile network technology, and an operating method thereof.

According to an aspect of the inventive concept, there is provided an operating method of a user equipment communicating with a base station in a 5G mobile network. The operating method includes setting at least one value of at least one time parameter based on at least one activated function in the 5G mobile network; determining a processing time for a PDSCH from the base station based on the at least one value; determining a capability of the user equipment by comparing the processing time with a reference time; and transmitting information including the capability of the user equipment to the base station.

According to another aspect of the inventive concept, there is provided an operating method of a user equipment communicating with a base station in a 5G mobile network. The operating method includes setting at least one time parameter to at least one value corresponding to a time required to process multicast and broadcast services (MBS)-related data in the 5G mobile network; determining a processing time for a PDSCH reflecting the at least one value; determining a capability of the user equipment based on the processing time; and transmitting information including the capability of the user equipment to the base station.

According to still another aspect of the inventive concept, there is provided an operating method of a user equipment communicating with a first base station based on a 5G mobile network. The operating method includes setting at least one time parameter to at least one value corresponding to a time required to cancel interference by a cell-specific reference signal (CRS) received from a second base station; generating a processing time for a PDSCH reflecting the at least one value; determining a capability of the user equipment based on the processing time; and transmitting information including the capability of the user equipment to the first base station.

According to a further aspect of the inventive concept, there is provided a user equipment including a transceiver configured to receive a PDSCH from a first base station based on a 5G mobile network; and a controller configured to generate information and transmit the information to the first base station through the transceiver, the information indicating a capability determined by a processing time for the PDSCH, wherein the controller is further configured to set at least one value of at least one time parameter based on an activated function in the 5G mobile network and determine the processing time for the PDSCH based on the at least one value of the at least one time parameter.

According to further aspects of the inventive concepts, the above operating methods are applied to mobile networks other than 5G networks, and the above-summarized UEs are employed in such other mobile networks.

BRIEF DESCRIPTION OF THE DRAWINGS

Embodiments of the inventive concept will be more clearly understood from the following detailed description taken in conjunction with the accompanying drawings in which:

FIG. 6C is a table of first and second time parameters in FIG. 6B;

FIG. 11A is a table showing first and second time parameters with respect to the frequency-axis width of an overlapping region, according to an example embodiment;

FIG. 12C is a table of third and fourth time parameters in FIG. 12B;

FIG. 14B is a table showing third and fourth time parameters with respect to a slot configuration, according to an example embodiment;

DETAILED DESCRIPTION OF EMBODIMENTS

Hereinafter, embodiments will be described in detail with reference to the accompanying drawings.

Figure 1:
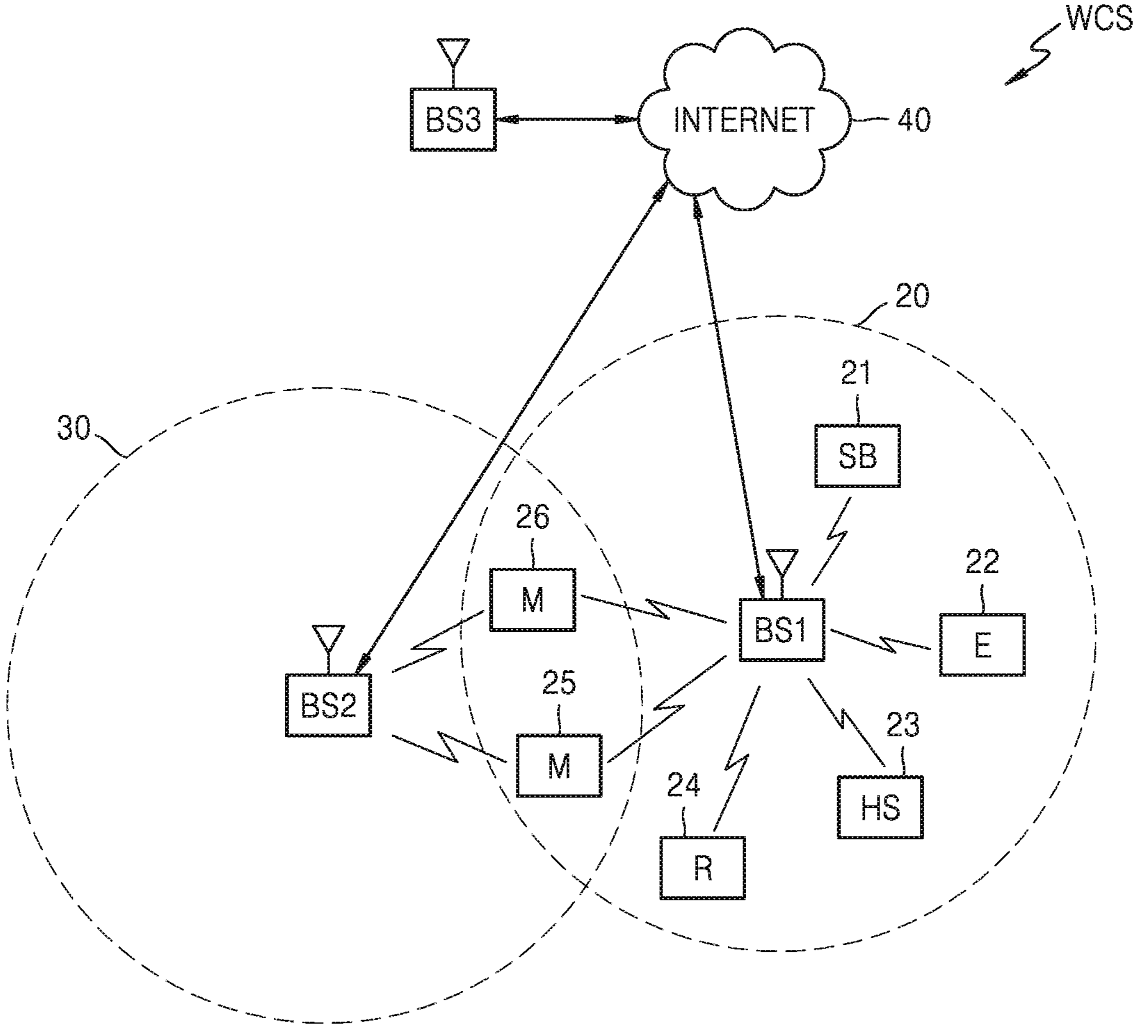
FIG. 1 is a diagram of a wireless communication system according to an example embodiment.

FIG. 1 is a diagram of a wireless communication system WCS according to an example embodiment. The wireless communication system WCS may include first to third base stations BS1, BS2, and BS3. The third base station BS3 may communicate with the first and second base stations BS1 and BS2, e.g., through at least one network 40 such as the Internet, a private Internet protocol (IP) network, or other data network.

The first base station BS1 may provide wireless broadband access to a plurality of user equipments (UEs) 21 to 26 in a coverage area 20. For example, UE 21 may be located in a small business SB, UE 22 may be located in an enterprise E, UE 23 may be located in a WiFi hot spot HS, UE 24 may be located in a residence R, and UEs 25 and 26 may each correspond to a mobile device M such as a cellular phone, a wireless laptop, or a wireless personal digital assistant (PDA). The second base station BS2 may provide wireless broadband access to UEs 25 and 26 in a coverage area 30 thereof. In an example embodiment, the first through third base stations BS1, BS2, and BS3 may communicate with one another or with the UEs 21 to 26 using fifth-generation (5G), long-term evolution (LTE), LTE-advanced (LTE-A), WiMAX, WiFi, code division multiple access (CDMA), global system for mobile communications (GSM), wireless local area network (WLAN), or other wireless communication technology.

Hereinafter, to facilitate understanding of concepts taught herein, an example is presented in which the first base station BS1 supports 5G mobile network-based communication, and the second base station BS2 supports LTE mobile network-based communication. The example also assumes that UEs 25 and 26 are located in an overlapping area between the coverage area 20 of the first base station BS1 and the coverage area 30 of the second base station BS2, and the UEs 25 and 26 support 5G mobile network-based communication. Hereinafter, operations of the UE 25 are primarily described, but such operations may also be applied to UEs 21 to 24 and 26. Aspects of the inventive concept may be applied to next generation mobile network communication as well as 5G mobile network communication.

The first base station BS1 may transmit a control channel including downlink or uplink scheduling information to the UE 25. The UE 25 may perform 5G mobile network-based communication with the first base station BS1 based on the control channel. For example, the UE 25 may identify a physical downlink shared channel (PDSCH), which is received from the first base station BS1, based on information included in the control channel, decode the PDSCH, and obtain data included in the PDSCH. A PDSCH is a downlink channel that may carry different types of data, including user data. Herein, when a UE "receives a PDSCH" from a base station, the UE receives data from the base station through the PDSCH.

In an example embodiment, a wireless system including the first base station BS1 and the UE 25 may support various functions of a 5G mobile network defined in the 3rd Generation Partnership Project (3GPP) Release 17 or the like. Some of the various functions of the 5G mobile network may influence the PDSCH processing time of the UE 25. In an example embodiment, the functions may include multicast and broadcast services (MBS) and/or cancellation of interference by a cell-specific reference signal (CRS).

MBS may also be referred to as multimedia broadcast multicast services (MBMS). According to MBS, the same content may be transmitted to a plurality of UEs in an MBS service area. Point-to-multipoint wireless resources are allocated to base stations participating in transmission so that the same signal may be transmitted to the UEs of all users that have subscribed to the MBS.

Cancellation of interference by a CRS may refer to an operation, performed by a UE in communication with a first base station, of cancelling interference by a CRS received from a neighboring base station, e.g., UE 25 in communication with the base station BS1 canceling interference by a CRS from the second base station BS2.

Besides those mentioned above, there may be various 5G mobile network functions that may influence the PDSCH processing time of the UE 25. When these functions are activated, the UE 25 may determine (e.g., by calculation) and allocate the PDSCH processing time, taking into account the activated functions. Hereinafter, operations performed by the UE 25 when the functions of MBS and/or the cancellation of interference by a CRS is activated are mainly described.

In an example embodiment, the UE 25 may set the value of at least one time parameter based on an activated function in a 5G mobile network. The time parameter may be referred to as a time relaxation parameter. The term "activated function" as used herein may refer to a function selected by the first base station BS1 and supported by both the first base station BS1 and the UE 25. For example, a function that is not selected by the first base station BS1 or is not supported by either the first base station BS1 or the UE 25 may be referred to as an inactivated function. The time parameter corresponds to an activated function, and the UE 25 may set the time parameter to a predetermined value according to the activated function or to a variable value according to a network state. "Network state" as used herein may refer to a state concerning heterogeneous signals overlapping a "data frequency region" allocated to the PDSCH of a UE. For example, "network state" may relate to a degree of overlap between a data frequency region of NR and signals of LTE, and the like. The details thereof are described below.

In an example embodiment, the UE 25 may determine a processing time for a PDSCH, which is received from the first base station BS1, based on a value of at least one time parameter. Equations related to the processing time may be defined in 3GPP TS 38.214 or the like, as described in detail below.

In an example embodiment, the UE 25 may compare a PDSCH processing time with a reference time and determine the capability thereof. For example, the reference time may vary with an activated function. When the activated function is expected to increase the PDSCH processing time, the reference time may be increased compared to before, and vice versa (the reference time is positively correlated with the determined PDSCH processing time). In other words, the capability of a UE may not be accurately determined when an increased PDSCH processing time (due to an activated function) is compared to a reference time used before the function was activated. Accordingly, the reference time may be changed according to the activated function according to embodiments herein.

In an example embodiment, the UE 25 may transmit information including the capability thereof to the first base station BS1. The first base station BS1 may recognize the capability of the UE 25 by referring to the information received from the UE 25 and determine the hybrid automatic repeat and request (HARQ) Ack/Nack timing of the UE 25. The details thereof are described below.

According to an example embodiment, a UE may accurately determine a PDSCH processing time, taking into account a 5G mobile network function influencing the PDSCH processing time, such that a base station may effectively configure a network for communication with the UE. As a result, the communication capability between the base station and the UE may be enhanced.

Figure 2:
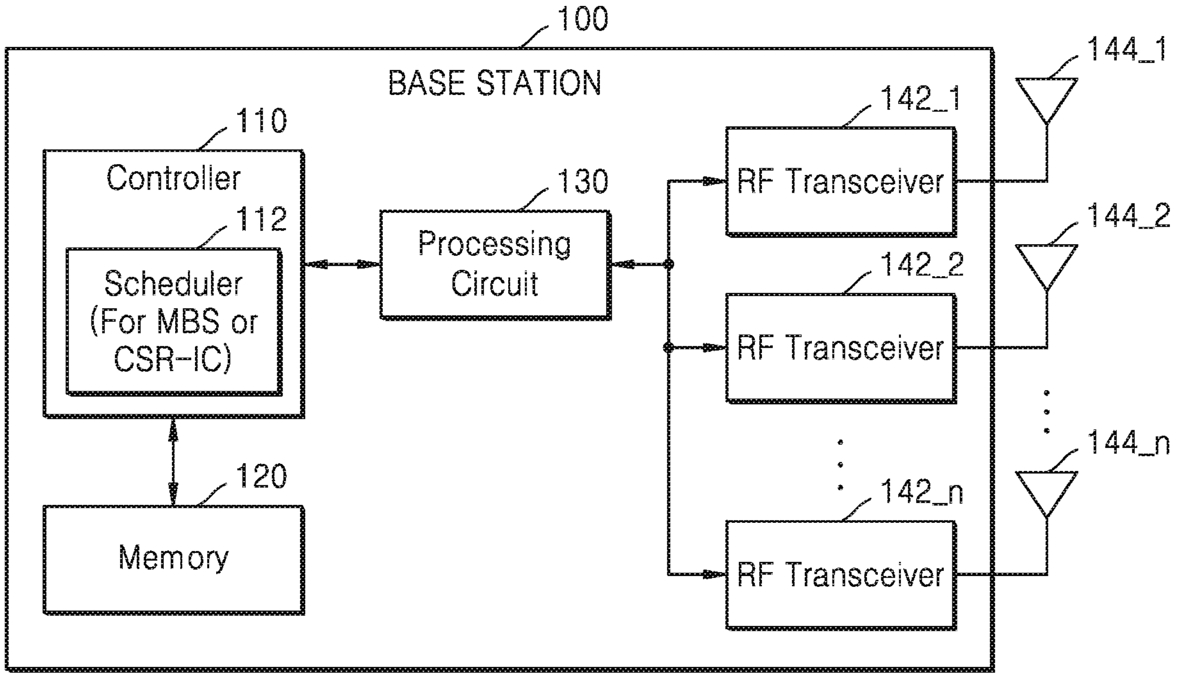
FIG. 2 is a block diagram of an implementation of a base station according to an example embodiment.

FIG. 2 is a block diagram of an implementation of a base station 100 according to an example embodiment. The implementation of the base station 100 is just an example, and thus, embodiments are not limited thereto. The implementation of the base station 100 may be applied to the first base station BS1 in FIG. 1.

Referring to FIG. 2, the base station 100 may include a controller 110, a memory 120, a processing circuit 130, a plurality of radio frequency (RF) transceivers 142_1 to 142_n, and a plurality of antennas 144_1 to 144_n. Each of the RF transceivers 142_1 to 142_n may receive an RF signal from a UE in a network through a corresponding one of the antennas 144_1 to 144_n. Each of the RF transceivers 142_1 to 142_n may generate an intermediate frequency (IF) or a baseband signal by performing frequency down-conversion on the received RF signal. The processing circuit 130 may generate data signals by filtering, decoding, and/or digitizing IF or baseband signals. The controller 110 may additionally process the data signals.

The processing circuit 130 may receive data signals from the controller 110. The processing circuit 130 may encode, multiplex, and/or convert into analog the data signals. The RF transceivers 142_1 to 142_n may perform frequency up-conversion on IF or baseband signals output from the processing circuit 130 and transmit RF signals to the antennas 144_1 to 144_n. In some embodiments, the processing circuit 130 may be referred to as an RF integrated circuit.

In an example embodiment, the controller 110 may perform general communication control operations of the base station 100 for 5G mobile network-based communication and may include a scheduler 112 that schedules the uplink and downlink to a UE. In an example embodiment, the scheduler 112 may perform scheduling based on the capability received from a UE, taking into account the MBS and/or the cancellation of interference by a CRS (i.e., CRS-interference cancellation (IC)). In some embodiments, the controller 110 may be referred to as a baseband processor.

The controller 110 may execute a program and/or a process stored in the scheduler 112 to perform general communication control of the base station 100. In some embodiments, the scheduler 112 may be stored in the memory 120 as program code, and the controller 110 perform the operation of the scheduler 112 by accessing the memory 120 and executing the program code.

Figure 3:
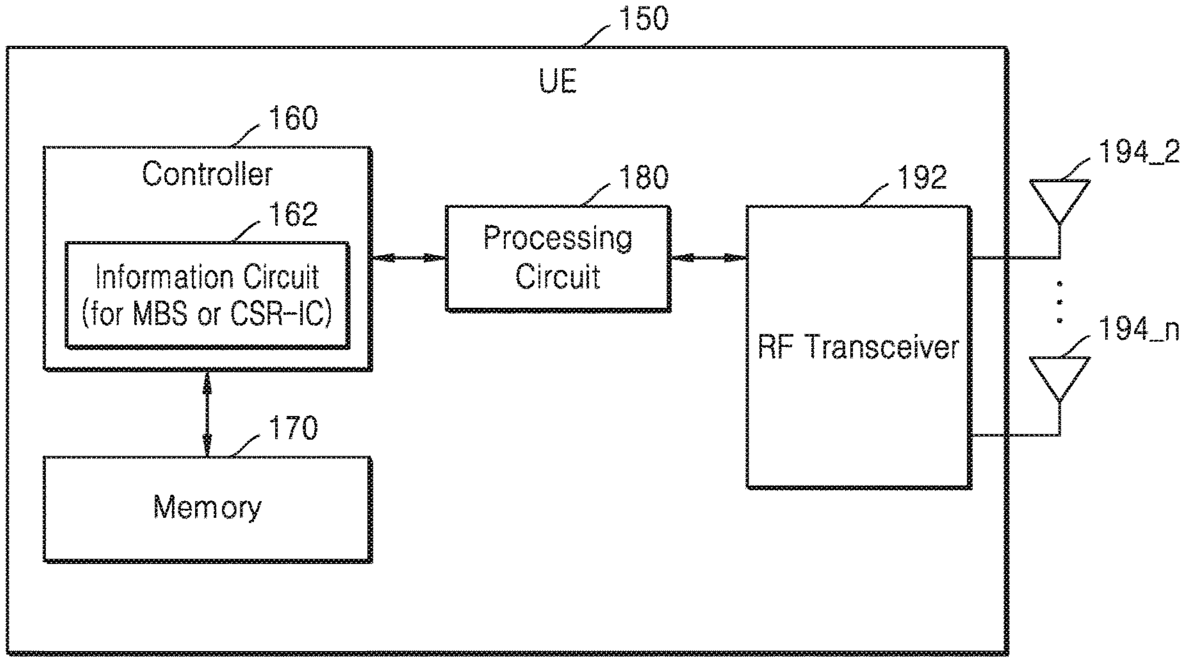
FIG. 3 is a block diagram of an implementation of a user equipment (UE) according to an example embodiment.

FIG. 3 is a block diagram of an implementation of a UE 150 according to an example embodiment. The implementation of the UE 150 is just an example, and embodiments are not limited thereto. The implementation of the UE 150 may be applied to the UE 25 in FIG. 1.

Referring to FIG. 3, the UE 150 may include a controller 160, a memory 170, a processing circuit 180, an RF transceiver 192, and a plurality of antennas 194_1 to 194_m. Although not shown, the UE 150 may further include an element such as a speaker, an input/output interface, a touch screen, or a display.

The RF transceiver 192 may receive RF signals from a base station through the antennas 194_1 to 194_m. The RF transceiver 192 may down-convert the RF signals into IF or baseband signals. The processing circuit 180 may generate data signals by filtering, decoding, and/or digitizing IF or baseband signals. The controller 160 may additionally process the data signals. In some embodiments, the processing circuit 180 may be referred to as an RF integrated circuit.

The processing circuit 180 may receive data signals from the controller 160. The processing circuit 180 may encode, multiplex, and/or convert into analog the data signals. The RF transceiver 192 may perform frequency up-conversion on IF or baseband signals output from the processing circuit 180 and transmit RF signals to the antennas 194_1 to 194_m In an example embodiment, the controller 160 may perform general communication control operations for 5G mobile network-based communication and may include an information circuit 162. In some embodiments, the controller 160 may be referred to as a baseband processor.

In an example embodiment, the information circuit 162 may determine a processing time for a received PDSCH, taking into account MBS and/or CSR-IC when one or both of these functions is activated. In detail, when MBS are activated, the information circuit 162 may determine a value of at least one time parameter based on an overlap pattern between a common frequency region allocated to an MBS PDSCH and a data frequency region allocated to a unicast (or group cast) PDSCH. When CRS-IC is activated, the information circuit 162 may determine a value of at least one time parameter based on the slot configuration of a PDSCH and/or the number of LTE mobile network-based CRSs, which overlap with a data frequency region allocated to the PDSCH and are received from another base station. Here, the number of CRSs overlapping with the data frequency region may be interpreted as the number of symbols, to which a CRS is allocated among symbols included in the data frequency region.

In an example embodiment, the information circuit 162 may determine a PDSCH processing time using at least one time parameter, which is determined, taking into account MBS or CRS-IC, and determine the capability thereof. The information circuit 162 may generate information including the capability thereof and transmit the information to a base station through the processing circuit 180, the RF transceiver 192, and the antennas 194_1 to 194_*m*.

The controller 160 may execute a program and/or a process stored in the memory 170 to perform general communication control operations of the UE 150. In an example embodiment, the information circuit 162 may be stored in the memory 170 as program code, and the controller 160 may perform the operations of the information circuit 162 by accessing the memory 170 and executing the program code. The memory 170 may also store a table utilized to determine a PDSCH processing time, where the table may contain values of time parameters described below and may be consistent with standards such as 5G.

Figure 4A:
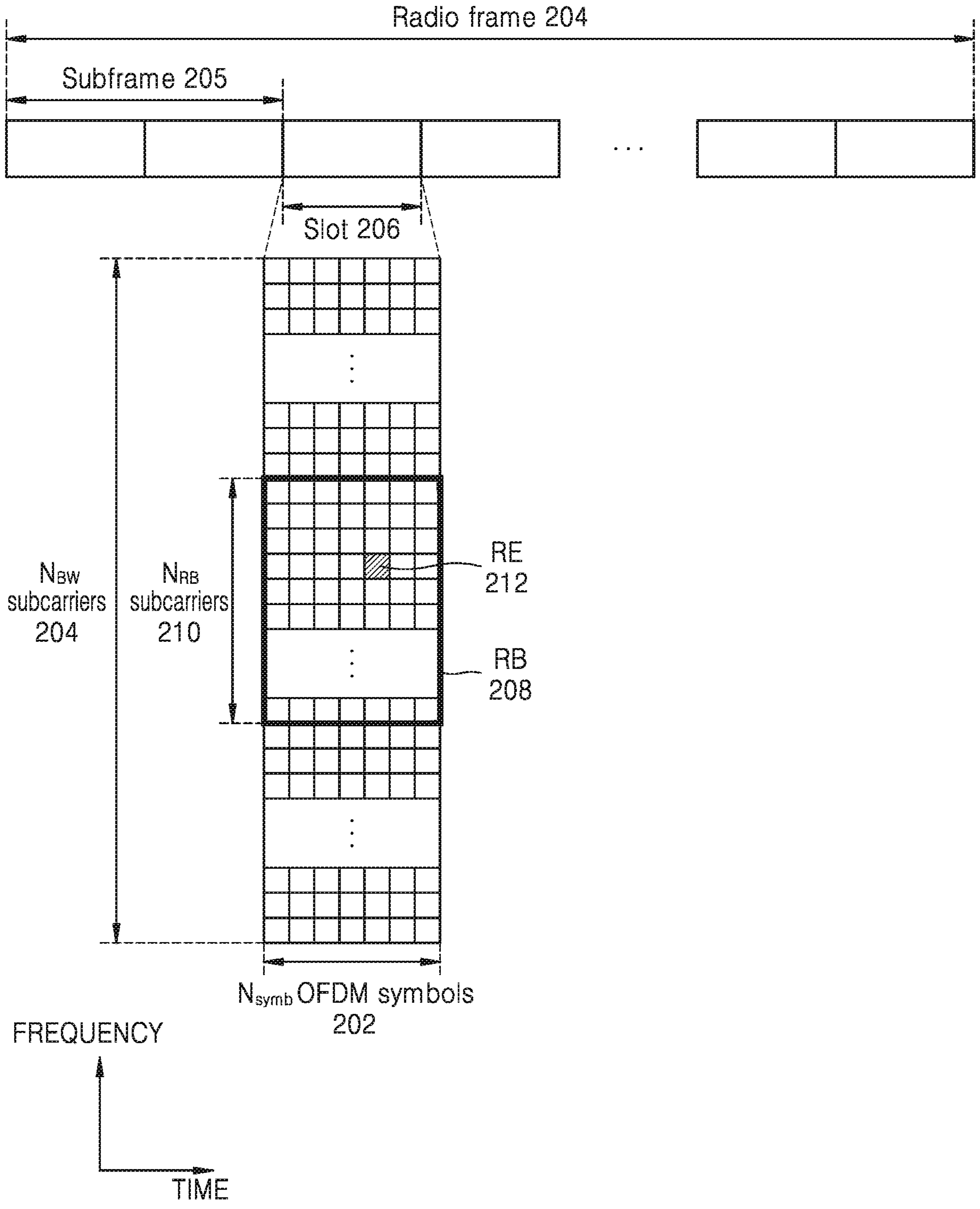
FIG. 4A is a diagram illustrating the basic structure of a time-frequency domain, which is a wireless resource domain in a wireless communication system, according to an example embodiment.
Figure 4B:
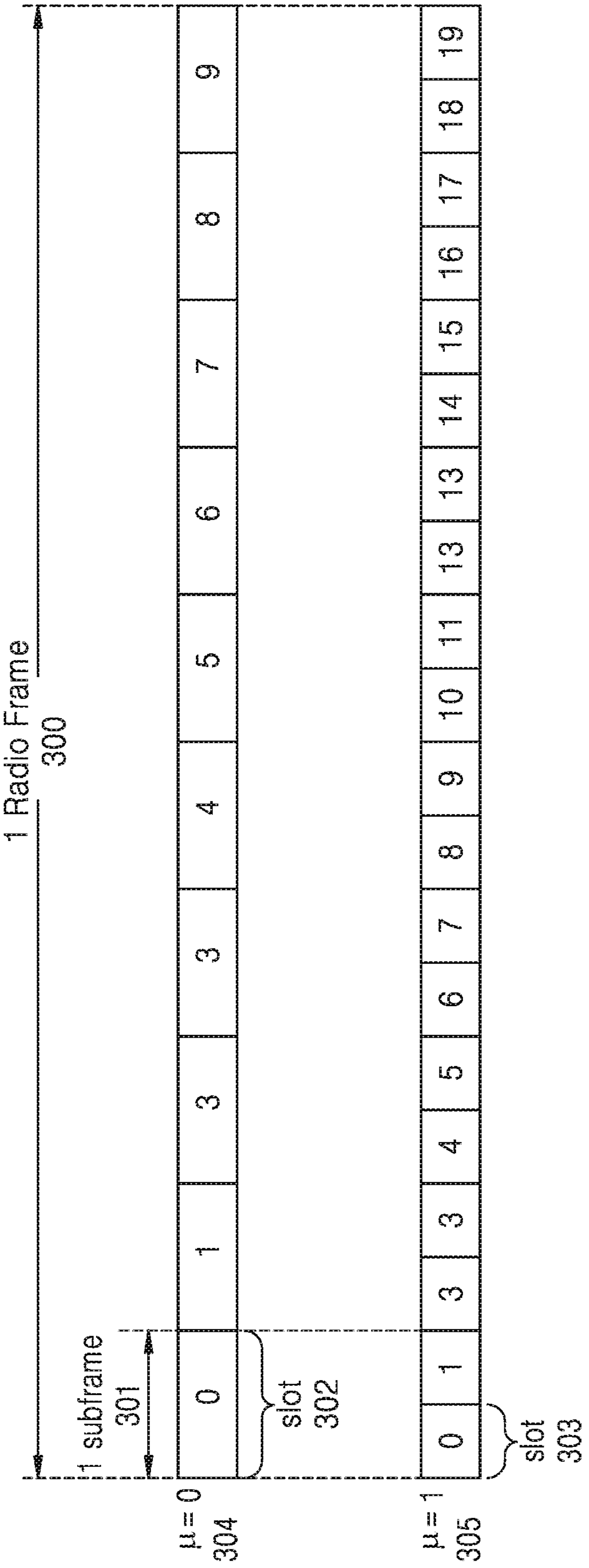
FIG. 4B is a diagram illustrating the slot structure of a wireless system according to an example embodiment.

FIG. 4A is a diagram illustrating the basic structure of a time-frequency domain, which is a wireless resource domain in a wireless communication system, according to an example embodiment. FIG. 4B is a diagram illustrating the slot structure of a wireless system according to an example embodiment.

Referring to FIG. 4A, the horizontal axis is a time domain and the vertical axis is a frequency domain. A minimum transmission unit in the time domain is an orthogonal frequency division multiplexing (OFDM) symbol, and $N_{symb}$ OFDM symbols 202 may constitute a single slot 206. Two slots may constitute a single subframe 205. For example, the length of the slot 206 may be 0.5 ms, and the length of the subframe 205 may be 1.0 ms. However, this is just an example embodiment, and the length of the slot 206 may vary with the configuration thereof. The subframe 205 is based on an LTE mobile network, and the time-frequency domain may be defined based on the slot 206 in a 5G mobile network. A radio frame 204 may correspond to a time-domain unit including ten subframes 205.

A minimum transmission unit in the frequency domain is a subcarrier, and a total system transmission bandwidth may include $N_{BW}$ subcarriers 204. A basic unit of a resource in the time-frequency domain may be a resource element (RE) 212 and may be represented by an OFDM symbol index and a subcarrier index. A resource block (RB) 208 may be defined by $N_{symb}$ OFDM symbols 202 consecutive in the time domain and $N_{RB}$ subcarriers 210 consecutive in the frequency domain. Accordingly, one RB 208 may include $N_{symb}*N_{RB}$ REs 212. An RB pair may correspond to a unit of two RBs 208 consecutive along the time axis and include $2N_{symb}*N_{RB}$ REs 212.

A PDSCH allocated to resources in the time-frequency domain in FIG. 4A may be transmitted from a base station to a UE in a wireless communication system. In an example embodiment, when MSB is activated, a PDSCH may include a first PDSCH for the MBS and a second PDSCH based on unicast (or group cast). An overlap pattern between a common frequency region allocated to the first PDSCH and a data frequency region allocated to the second PDSCH may vary, as described in detail below. In an example embodiment, when CRS-IC is activated, a data frequency region allocated to a PDSCH may overlap with a CRS based on an LTE mobile network. This will be described in detail below.

According to an example embodiment, a UE may take into account signals overlapping with a PDSCH according to an activated function when generating a processing time for the PDSCH. The PDSCH processing time may vary with an overlap state.

Referring further to FIG. 4B, a frame or a radio frame 300 may be defined to be 10 ms, and a subframe 301 may be defined to be 1 ms. The radio frame 300 may include a total of ten subframes 301. A slot 302 and a slot 303 may be defined to be 14 OFDM symbols (i.e., the number of symbols per slot $$(N_{symb}^{slot}) = 14).$$

The subframe 301 may include one slot 302 or a plurality of slots 303. The number of slots 302 or 303 per one subframe 301 may vary with a subcarrier interval set value μ or the number of symbols included in the slot 302 or 303. FIG. 4B shows a case 304 where the subcarrier interval set value μ=0 and a case 305 where the subcarrier interval set value μ=1. In the case 304 where the subcarrier interval set value μ=0, the subframe 301 may include one slot 302. In the case 304 where the subcarrier interval set value μ=1, the subframe 301 may include two slots 303.

As described above, the number of slots per subframe may vary with the subcarrier interval set value μ, and accordingly, the number of slots per frame may be changed. The number of slots per subframe according to the subcarrier interval set value μ, $$N_{slot}^{subframe,\mu},$$

and the number of slots per frame according to the subcarrier interval set value μ, $$N_{slot}^{subframe,\mu},$$

may be defined as shown in Table 1.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In some embodiments, the number of slots per subframe may vary with the number of symbols included in one slot.

In an example embodiment, when CRS-IC is activated, a UE may determine a PDSCH processing time based on a slot configuration. In other words, because a CRS is transmitted by a subframe having a fixed format (e.g., a subcarrier interval of 15 kHz) of an LTE mobile network while a slot configuration for a PDSCH based on a 5G mobile network is variable, CRS-IC may need to be performed using different methods according to slot configurations. A time taken for CRS-IC may vary with the different methods. Accordingly, in an example embodiment, a UE may select a method consistent with a slot configuration, perform CRS-IC based on the selected method, and determine a PDSCH processing time, taking into account a time for the selected method.

Figure 5A:
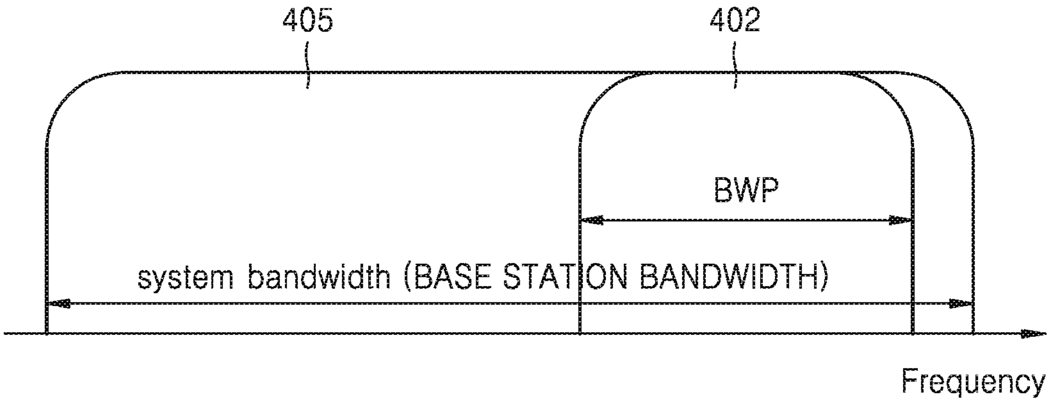
FIGS. 5A, 5B and 5C illustrate respective examples of managing a bandwidth part (BWP) in a wireless system, according to various embodiments.
Figure 5B:
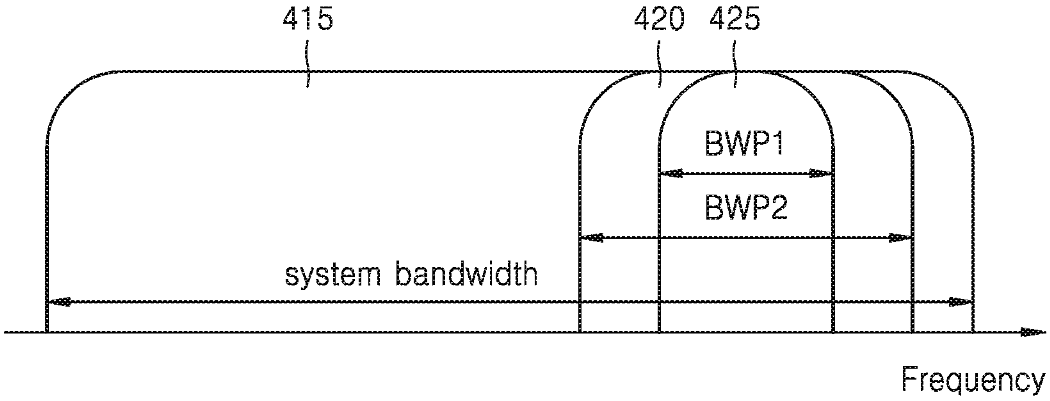
Figure 5C:
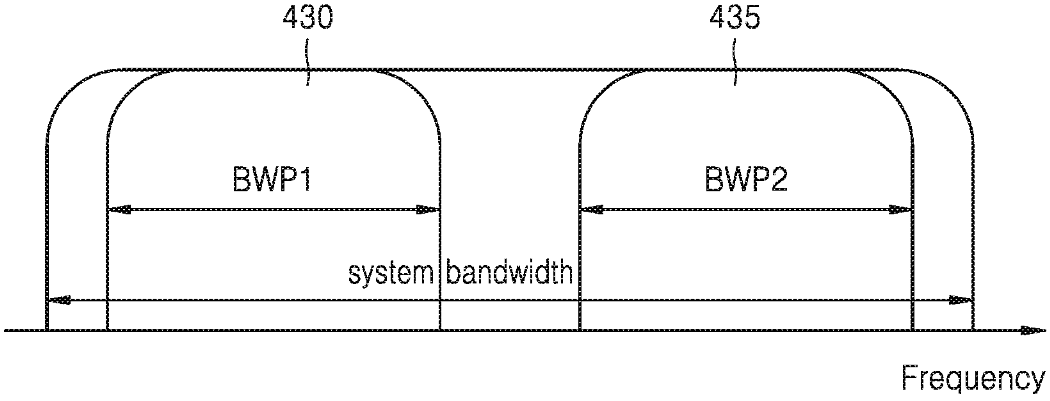

FIGS. 5A-5C illustrates examples of managing a bandwidth part (BWP) in a wireless system, according to various embodiments. When a UE performs communication using only a part of a system frequency bandwidth of a base station, BWP may be used in a wireless system. BWP may be used for reduction in UE manufacturing cost or UE power saving. BWP may be set by a base station for only UEs that support BWP.

Referring to FIGS. 5A-5C, there may be three main BWP management scenarios. In the first scenario, BWP is used for a UE that supports only a frequency bandwidth 402 that is narrower than a system frequency bandwidth 405 used by a cell. To save manufacturing cost, a UE may be developed to support a limited frequency bandwidth. The UE needs to report to a base station that the UE supports only the limited frequency bandwidth, and the base station may set, according to the report, a maximum bandwidth supported by the UE or a BWP that is narrower than the maximum bandwidth.

In the second scenario, BWP is used for UE power saving. For example, although a UE is capable of communicating using a system bandwidth 415 used by a base station or a part (e.g., a BWP2 420) of the system bandwidth 415, the base station may set a narrower frequency bandwidth (e.g., a BWP1 425) for power saving.

In the third scenario, individual BWPs are used in correspondence to different numerologies. Numerology refers to diversification of physical layer configuration to realize optimal data transmission in accordance with various service requirements. For example, a subcarrier interval in an OFDM access (OFDMA) structure including a plurality of subcarriers may be variably adjusted according to a certain requirement. A UE may perform communication based on a plurality of numerologies at a time. in FIG. 5C, because physical layer configurations corresponding to the respective numerologies may differ, the numerologies may be classified into a BWP1 430 and a BWP2 445.

When a UE transitions from an RRC_IDLE state or an RRC_INACTIVE state to an RRC_CONNECTED state, a BWP used by the UE to try to access a network is referred to as an initial BWP. When the UE successfully accesses a base station and enters the RRC_CONNECTED state, the base station may set an additional BWP for the UE.

In the three scenarios described above, a plurality of BWPs may be set for a UE, and thereafter, a certain one of the BWPs may be activated by a base station. For example, in the third scenario, the BWP1 430 and the BWP2 445 may be set for a UE, and one of the BWP1 430 and the BWP2 445 may be activated by a base station. Accordingly, the UE may transmit and receive data using a BWP that is activated for downlink or uplink.

When a plurality of BWPs are set for a UE, the UE may change the activated BWP. This change is referred to as BWP switching. This may be performed by allocating resources to a desired BWP in a Physical Downlink Control Channel (PDCCH) transmitted by a base station.

The same numerology may be used in an unlicensed band in the third scenario. For example, because equipment such as a WLAN operates at a bandwidth of 20 MHz in the unlicensed band, a base station may set multiple 20-MHz BWPs, such as the BWP1 430 and the BWP2 445, and change each BWP for a UE or UEs according to the congestion of the unlicensed band.

Here, BWPs in FIGS. 5A-5C may be applied to a data frequency region, to which a PDSCH based on unicast (or group cast) is allocated. In an example embodiment, an activated BWP may be changed, and accordingly, there may be various overlap patterns between a common frequency region allocated to an MBS PDSCH and a data frequency region allocated to a PDSCH based on unicast (or group cast). A UE may consider the overlap pattern when generating a PDSCH processing time. However, in some embodiments, the BWPs in FIGS. 5A-5C may also be applied to the common frequency region allocated an MBS PDSCH.

Figure 6A:
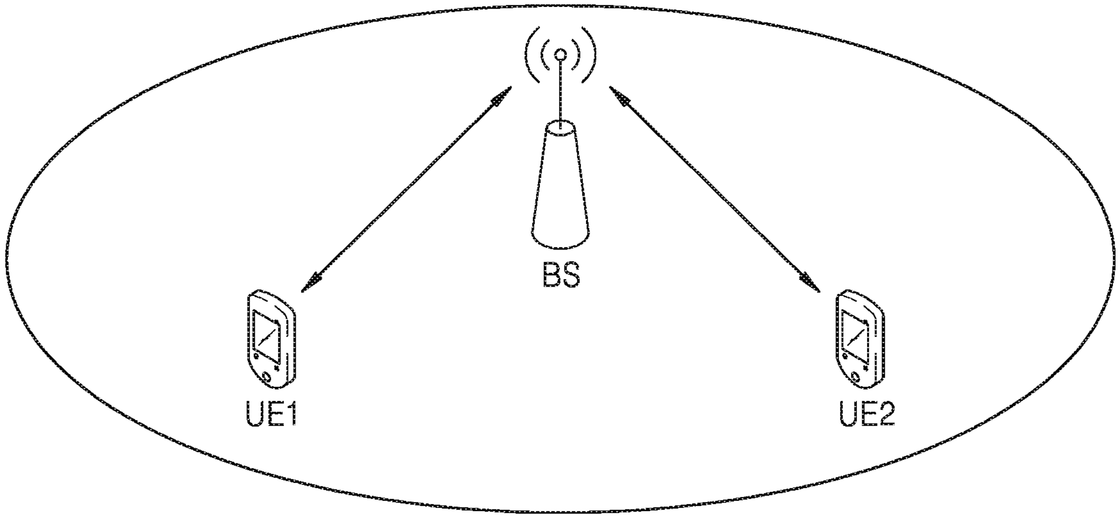
FIG. 6A is a diagram of a wireless system, in which multicast and broadcast services (MBS) are activated, according to an example embodiment.
Figure 6B:
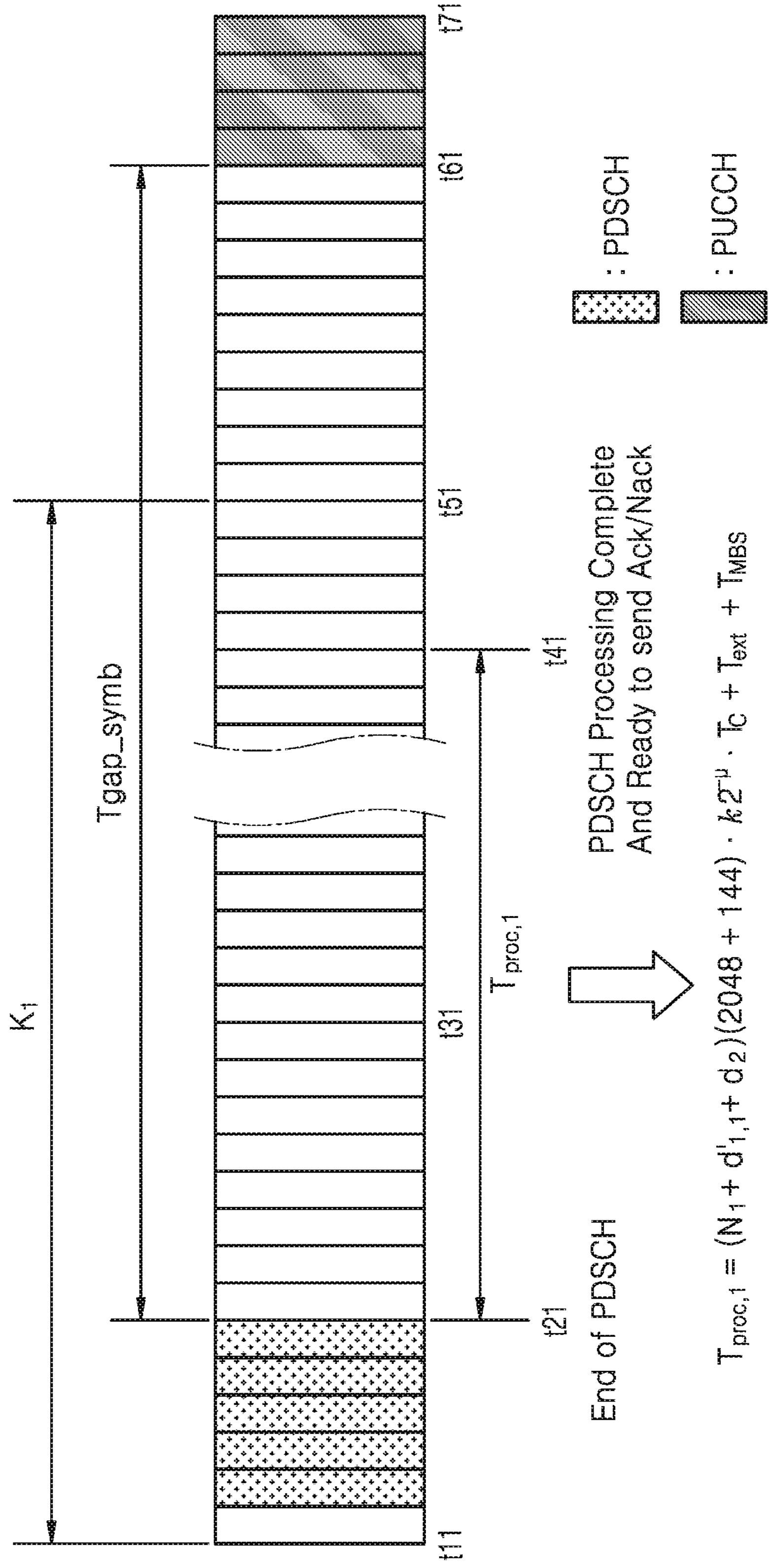
FIG. 6B is a diagram of a method of calculating a physical downlink shared channel (PDSCH) processing time, taking into account the MBS, according to an example embodiment.

FIG. 6A is a diagram of a wireless system, in which MBS is activated, according to an example embodiment. FIG. 6B is a diagram of a method of calculating a PDSCH processing time $T_{proc,1}$, taking into account the MBS, according to an example embodiment. FIG. 6C is a table of first and second time parameters in FIG. 6B.

Referring to FIG. 6A, the wireless system may include a base station BS and first and second user equipments UE1 and UE2. MBS may be activated in the wireless system, and the base station BS may transmit a first PDSCH for the MBS to each of the first and second user equipments UE1 and UE2 (the same first PDSCH is transmitted, with the same data or content, to each of UE1 and UE2). In an example to explain concepts taught herein, the base station BS may transmit, to the first user equipment UE1, a second PDSCH based on unicast (or group cast) separately from the MBS.

In an example embodiment, the first user equipment UE1 may receive a PDSCH, interchangeably hereafter, a "global PDSCH", including the first PDSCH and the second PDSCH and perform decoding on the first PDSCH and the second PDSCH. In other words, a global PDSCH processing time of the first user equipment UE1 may include a processing time for the first PDSCH and a processing time for the second PDSCH. Here, the processing time for the first PDSCH may be defined as a time required to process data related to MBS. Hereinafter, a method of calculating a PDSCH processing time is described with reference to FIG. 6B.

Referring to FIG. 6B, the base station BS may determine an Ack/Nack timing $K_1$ and a symbol reference time gap Tgap_symb based on a PDSCH processing time $T_{proc,1}$ of the first user equipment UE1. The PDSCH processing time $T_{proc,1}$ may be set as a difference between a second time t21, at which transmission of a PDSCH is completed, and a fourth time t41, at which PDSCH processing is completed and transmission of an Ack/Nack signal is ready. The Ack/Nack timing $K_1$ may be defined as the time gap between the transmission of the PDSCH by the base station BS and the reception of a physical uplink control channel (PUCCH) including the Ack/Nack signal by the base station BS. The Ack/Nack timing $K_1$ may indicate the time delay between a PDSCH slot and an uplink control information (UCI) slot including the Ack/Nack signal. For example, the Ack/Nack timing $K_1$ may be set as the difference between a first time t11 and a fifth time t51. The symbol reference time gap Tgap_symb may be set as the difference between the second time t21, at which PDSCH transmission is completed, and a sixth time t61, at which PUCCH reception starts.

In an example embodiment, the PDSCH processing time $T_{proc,1}$ of the first user equipment UE1 may be calculated using Equation 1.

[Equation 1]

$$T_{proc,1} = (N_1 + d'_{1,1} + d_2)(2048 + 144) \cdot \kappa 2^{-\mu} \cdot T_C + T_{ext} + T_{MBS},$$
$$d'_{1,1} = d_{1,1} + Y$$

$T_{proc,1}$ is described in detail in section 5.3 of 3GPP TS 38.214, where the document 3GPP TS 38.214 is incorporated herein by reference. Hereinafter, first and second time parameters according to example embodiments are mainly described.

In an example embodiment, at least one time parameter is set to at least one value corresponding to a time required to process MBS-related data. When the at least one time parameter is a plurality of time parameters, it includes a first time parameter and a second time parameter. The first time parameter may be $T_{MBS}$, and the second time parameter may be Y added to $d_{1,1}$. In some embodiments, the at least one time parameter includes only one of the first and second time parameters $T_{MBS}$ and Y. In this regard, $T_{proc,1}$ may be calculated using Equation 2 or Equation 3.

[Equation 2]

$$T_{proc,1} = (N_1 + d_{1,1} + d_2)(2048 + 144) \cdot \kappa 2^{-\mu} \cdot T_C + T_{ext} + T_{MBS}$$

[Equation 3]

$$T_{proc,1} = (N_1 + d'_{1,1} + d_2)(2048 + 144) \cdot \kappa 2^{-\mu} \cdot T_C + T_{ext},$$
$$d'_{1,1} = d_{1,1} + Y1$$

Equation 2 corresponds to an embodiment of calculating a processing time, taking into account only the first time parameter $T_{MBS}$, and Equation 3 corresponds to an embodiment of calculating a processing time, taking into account only the second time parameter Y. Hereinafter, an embodiment of calculating a processing time, taking into account the first and second time parameters $T_{MBS}$ and Y, is mainly described, but embodiments are not limited thereto. The processing time may be calculated taking into account only one of the first and second time parameters $T_{MBS}$ and Y, and/or other time parameters.

Referring further to FIG. 6C, the first time parameter $T_{MBS}$ may be set to a value X1, and the second time parameter Y may be set to a value Y1. In an example embodiment, the values X1 and Y1 may be fixed values set in advance. In other words, when MBS is activated, the first user equipment UE1 may set, in response to the activation of the MBS, the first time parameter $T_{MBS}$ to the value X1 and the second time parameter Y to the value Y1 and calculate the processing time $T_{proc,1}$ using Equation 1.

In an example embodiment, the values X1 and Y1 may be variable. For instance, a UE may adjust the values X1 and Y1 based on an overlap pattern between a common frequency region allocated to the first PDSCH for MBS and a data frequency region allocated to the second PDSCH based on unicast (or group cast). The overlap pattern is a factor that determines the PDSCH processing time of the UE. As the complexity of the overlap pattern increases, the PDSCH processing time of the UE may increase. For example, the complexity of the overlap pattern may be determined by the frequency-axis width of an overlapping region, the number of overlapping regions, or the like. Example embodiments thereof are described below.

In an example embodiment, a plurality of UEs may process an overlapping region using different methods, and the values X1 and Y1 may vary with the UEs according to the processing methods. For example, a UE may process the second PDSCH first and then process the first PDSCH. Another UE may process the first PDSCH in an overlapping region first during processing of the second PDSCH and resume the processing of the second PDSCH after completing the processing of the first PDSCH.

As described above, the values X1 and Y1 used to determine a PDSCH processing time may vary.

Figure 7:
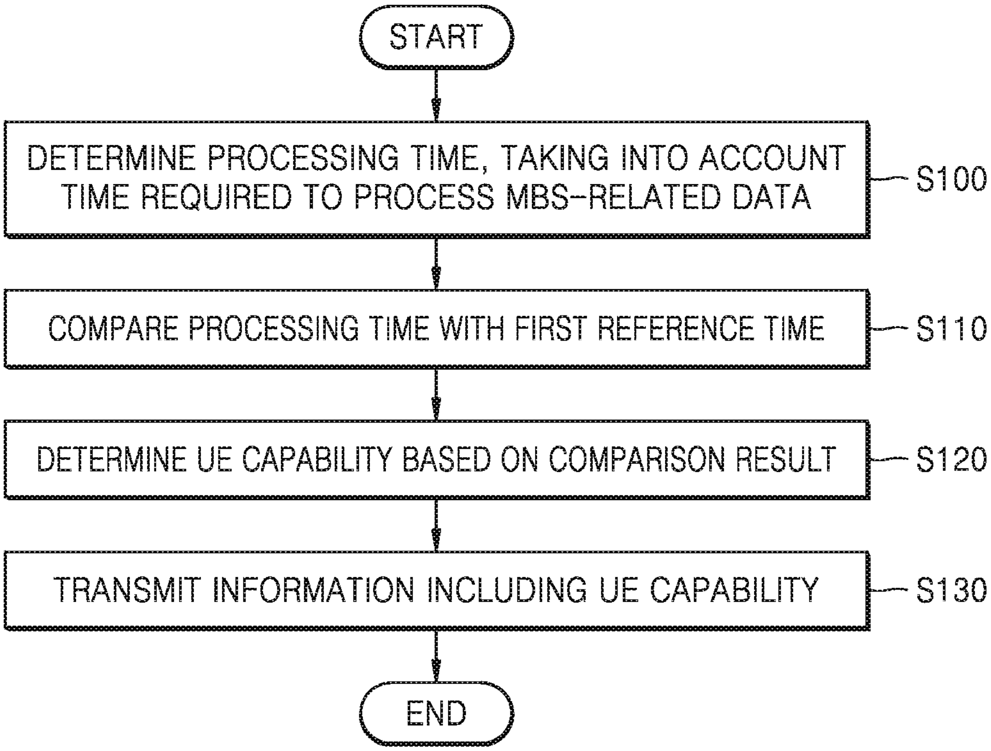
FIG. 7 is a flowchart of an operating method of a UE, according to an example embodiment.

FIG. 7 is a flowchart of an operating method of a UE, according to an example embodiment. In the method, the UE may determine a (global) PDSCH processing time, taking into account a time required to process MBS-related data, in operation S100. The UE may determine the PDSCH processing time, taking into account a time required to process the first PDSCH for the MBS and a time required to process the second PDSCH based on unicast (or group cast). The UE may compare the PDSCH processing time with a first reference time in operation S110. The first reference time when the MBS is activated may have a predetermined value (e.g., obtained from the base station) and may be different from a first reference time when the MBS are inactivated. For example, the first reference time when the MBS is activated may be longer than the first reference time when the MBS is inactivated. The UE may determine the capability thereof based on a comparison result in operation S120. For example, the UE may determine that the capability thereof is a first capability level (e.g., satisfactory or good) when the PDSCH processing time is shorter than the first reference time and set the capability thereof to a first value indicating a first level capability. The UE may determine that the capability thereof is a second capability level (e.g., unsatisfactory or poor) when the PDSCH processing time is longer than or equal to the first reference time and set the capability thereof to a second value indicating second level capability. The UE may transmit information including the capability thereof to a base station in operation S130. The base station may perform scheduling on the downlink and uplink to the UE based on the capability of the UE included in the received information.

Figure 8A:
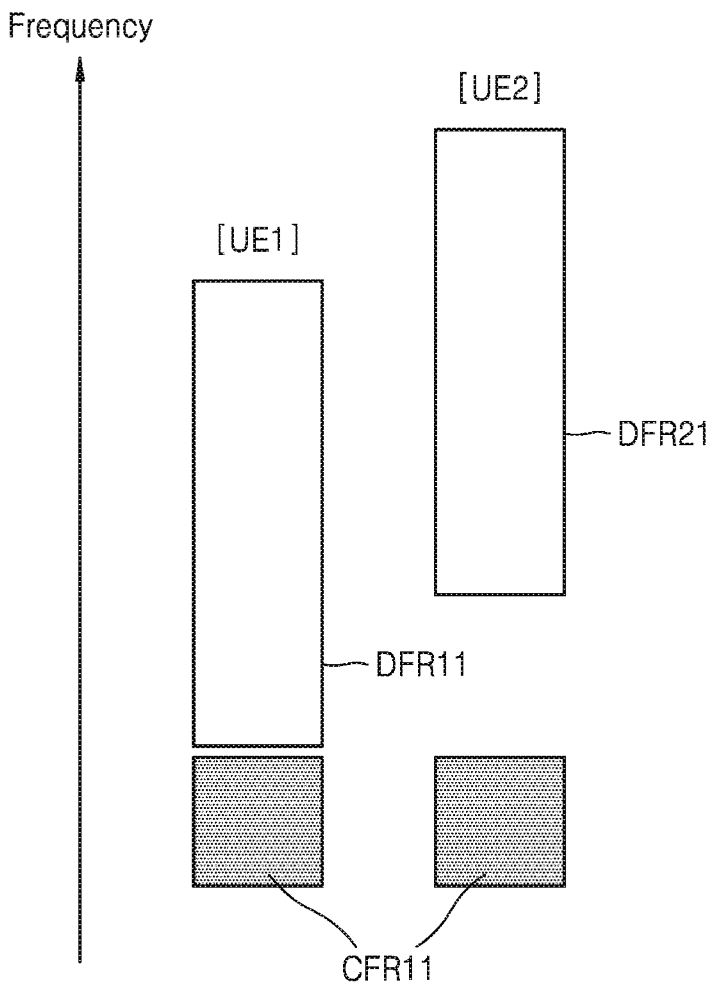
FIGS. 8A and 8B are diagrams of an example of an overlap pattern between a common frequency region and a data frequency region, according to an example embodiment.
Figure 8B:
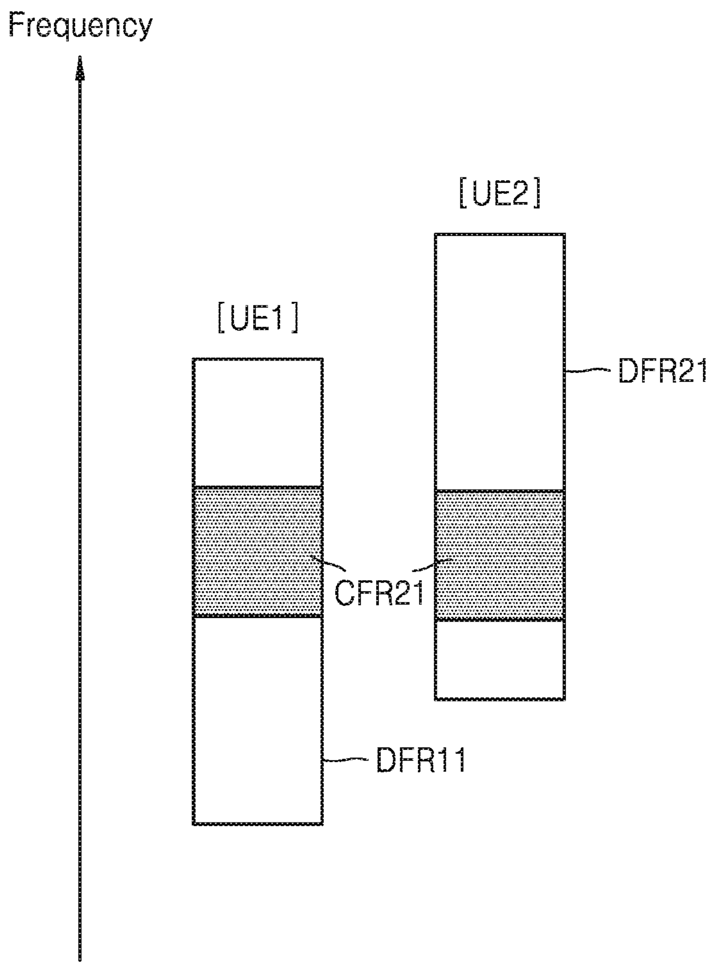

FIGS. 8A and 8B are diagrams of an example of an overlap pattern between a common frequency region and a data frequency region, according to an example embodiment. A common frequency region may be a frequency band within a global PDSCH allocated for MBS, in which the same data is transmitted to a plurality of UEs such as UE1 and UE2 as depicted in FIGS. 8A and 8B. A data frequency region may be a frequency band (used for unicast or group cast) within a global PDSCH allocated for a single UE or only some (a group less than all) of a plurality of UEs in communication with a base station, as explained further below. Thus, different data frequency regions may be received by different respective UEs.

Referring to FIG. 8A, the first PDSCH for MBS, which is transmitted to the first and second user equipments UE1 and UE2, may be allocated to a common frequency region CFR11. The second PDSCH based on unicast (or group cast), which is transmitted to the first user equipment UE1, may be allocated to a first data frequency region DFR11, and the second PDSCH based on unicast (or group cast), which is transmitted to the second user equipment UE2, may be allocated to a second data frequency region DFR21.

For example, each of the first and second data frequency regions DFR11 and DFR21 may not overlap with the common frequency region CFR11. The first and second user equipments UE1 and UE2 may respectively determine a PDSCH processing time, taking into account that the first and second data frequency regions DFR11 and DFR21, respectively, do not overlap with the common frequency region CFR11.

Referring to FIG. 8B, differently from FIG. 8A, each of the first and second data frequency regions DFR11 and DFR21 may overlap with the common frequency region CFR11. The first and second user equipments UE1 and UE2 may determine a PDSCH processing time, taking into account that the first and second data frequency regions DFR11 and DFR21 overlap with the common frequency region CFR11. (In FIG. 8B, DFR11 extends from the bottom to the top of the rectangle aligned with the frequency axis for UE1, and CFR21 occupies frequencies in a central portion of the rectangle; thus, DFR11 overlaps CFR21. Likewise, DFR21 extends from the bottom to the top of the rectangle for UE2 and thereby overlaps CFR21.)

In an example embodiment, a PDSCH processing time with respect to the overlap pattern in FIG. 8A may be shorter than a PDSCH processing time with respect to the overlap pattern in FIG. 8B.

Figure 9:
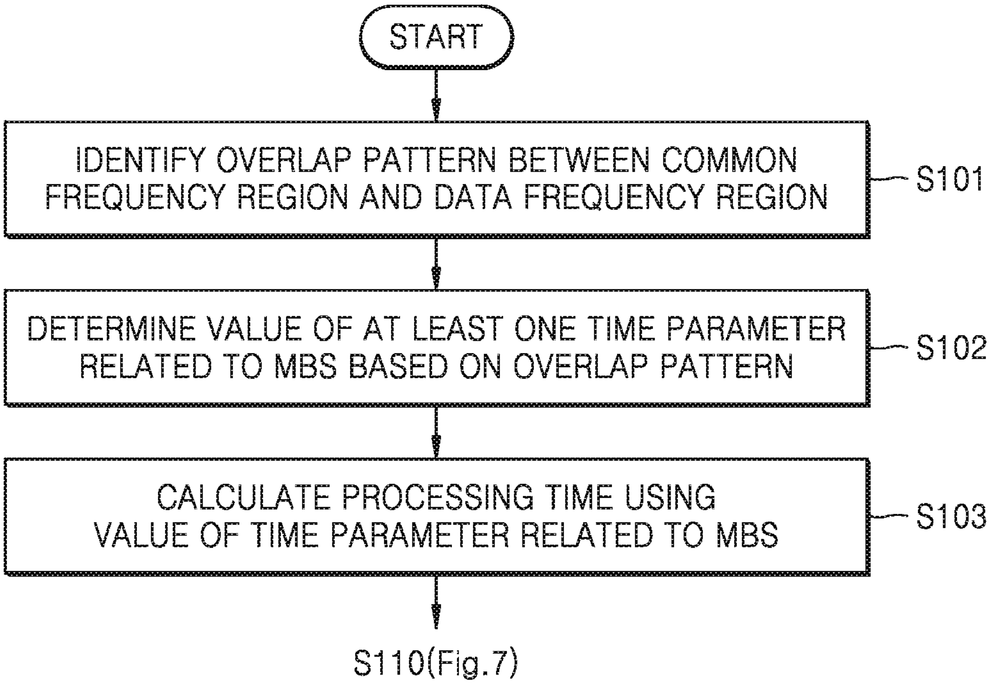
FIG. 9 is a detailed flowchart of operation S100 in FIG. 7.

FIG. 9 is a detailed flowchart of an example operation S100 in FIG. 7.

Referring to FIG. 9, the UE may identify an overlap pattern between a common frequency region and a data frequency region in operation S101. The UE may determine at least one value of at least one time parameter related to MBS based on the overlap pattern in operation S102. For example, the at least one time parameter value may have been obtained in advance according to the complexity of the overlap pattern or may be determined by a certain equation. The UE may calculate the PDSCH processing time using the time parameter value related to MBS in operation S103. Accordingly, the processing time calculated by the UE may vary with the overlap pattern.

Figure 10:
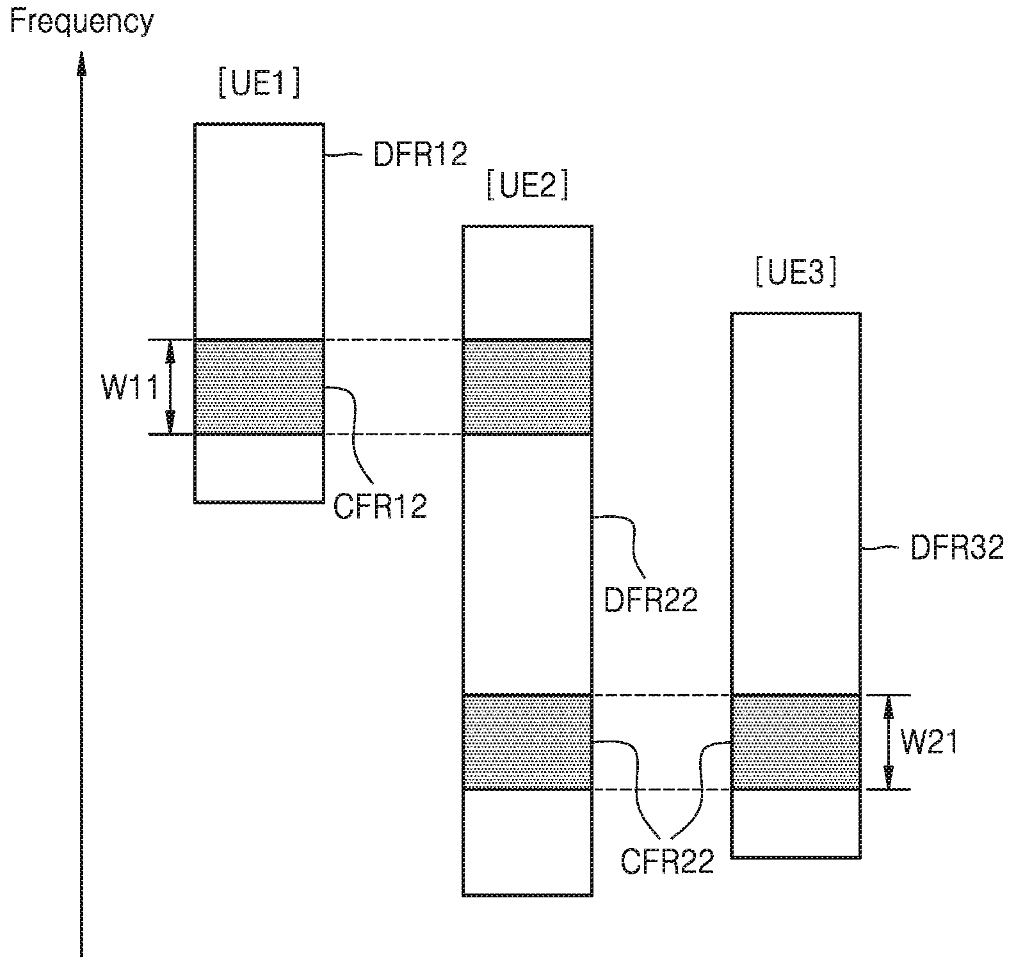
FIG. 10 is a diagram of an example of an overlap pattern between a common frequency region and a data frequency region, according to an example embodiment.

FIG. 10 is a diagram of an example of an overlap pattern between a common frequency region and a data frequency region, according to an example embodiment.

Referring to FIG. 10, the first PDSCH for MBS, which is transmitted to the first and second user equipments UE1 and UE2, may be allocated to a first common frequency region CFR12, and the first PDSCH for MBS, which is transmitted to second and third user equipments UE2 and UE3, may be allocated to a second common frequency region CFR22. Second PDSCHs based on unicast (or group cast), which are respectively transmitted to the first to third user equipments UE1, UE2, and UE3, may be allocated to first to third data frequency regions DFR12, DFR22, and DFR32. The first data frequency region DFR12 may correspond to a first BWP, the second frequency region DFR22 may correspond to a second BWP, and the third frequency region DFR32 may correspond to a third BWP.

For example, the first data frequency region DFR12 may overlap with the first common frequency region CFR12, and the frequency-axis width of an overlapping region therebetween may correspond to a first width W11. The second data frequency region DFR22 may overlap with the first and second common frequency regions CFR12 and CFR22. The frequency-axis width of an overlapping region between the second data frequency region DFR22 and the first common frequency region CFR12 may correspond to the first width W11, and the frequency-axis width of an overlapping region between the second data frequency region DFR22 and the second common frequency region CFR22 may correspond to a second width W21. For example, the first width may be different from or the same as the second width W21.

As described above, the overlap pattern may be defined by the number of overlapping regions, the frequency-axis width of an overlapping region, or the like. For example, the second user equipment UE2 has an overlap pattern including two overlapping regions and may thus determine a longer PDSCH processing time than the first and third user equipments UE1 and UE3. When the first width W11 is different from the second width W21, the first and third user equipments UE1 and UE3 may determine different PDSCH processing times. This will be described in detail below.

However, the embodiment of the overlap pattern in FIG. 10 is just an example, and embodiments are not limited thereto. There may be various overlap patterns. Accordingly, time parameter values with respect to complexities of overlap patterns may be defined.

Figure 11B:
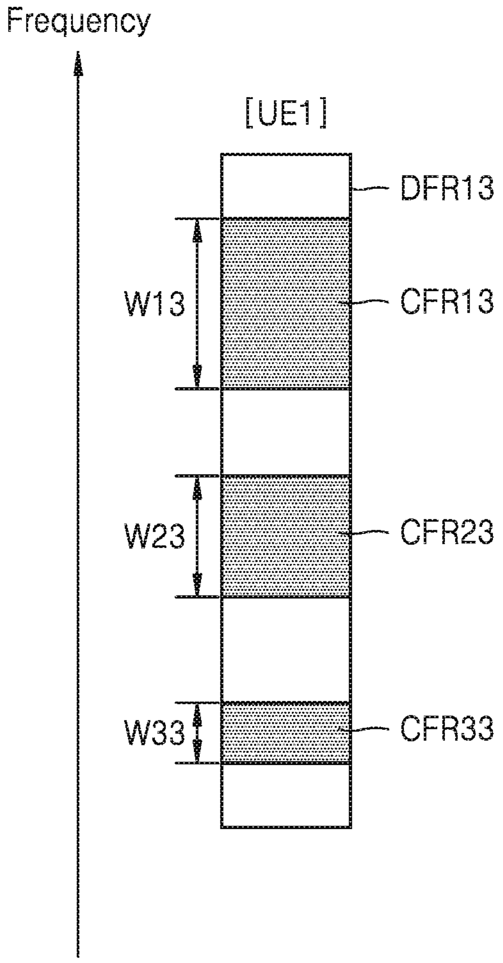
FIG. 11B is a diagram of an example of an overlap pattern between a common frequency region and a data frequency region, according to an example embodiment.

FIG. 11A is a table showing first and second time parameters with respect to the frequency-axis width of an overlapping region, according to an example embodiment. FIG. 11B is a diagram of an example of an overlap pattern between a common frequency region and a data frequency region, according to an example embodiment.

Referring to FIG. 11A, the values of the first and second time parameters may vary with the frequency-axis width of an overlapping region between a common frequency region and a data frequency region. The table of FIG. 11A may be obtained in advance. In an example embodiment, when the frequency-axis width of an overlapping region is in a first range RG1, the first and second time parameters may be respectively set to values X11 and Y11. When the frequency-axis width of an overlapping region is in a second range RG2, the first and second time parameters may be respectively set to values X21 and Y21. When the frequency-axis width of an overlapping region is in a third range RG3, the first and second time parameters may be respectively set to values X31 and Y31. As described above, the values of the first and second time parameters corresponding to each of a plurality of ranges may be obtained in advance.

Referring to FIG. 11B, the first PDSCH for MBS, which is transmitted to the first user equipment UE1, may be allocated to first to third common frequency regions CFR13, CFR23, and CFR33. The second PDSCH based on unicast (or group cast), which is transmitted to the first user equipment UE1, may be allocated to a data frequency region DFR13. The data frequency region DFR13 may correspond to a certain BWP.

In an example embodiment, the first user equipment UE1 may determine a PDSCH processing time based on an overlap pattern between the data frequency region DFR13 and the first to third common frequency regions CFR13, CFR23, and CFR33. The first user equipment UE1 may determine the PDSCH processing time based on the fact that there are three overlapping regions and on first to third widths W13, W23, and W33 of the respective overlapping regions along the frequency axis. For example, the first user equipment UE1 may identify in the table of FIG. 11A a range corresponding to the first width W13 that is the greatest among the first to third widths W13, W23, and W33 and set the values of the first and second time parameters. Thereafter, the first user equipment UE1 may set the final value of each of the first and second time parameters by multiplying each of the values of the first and second time parameters by three, corresponding to the number of overlapping regions. For example, when the values of the first and second time parameters corresponding to the first width W13 are the values X31 and Y31 in the third range RG3, the first user equipment UE1 may set the first and second time parameters to triple the value of X31 and triple the value of Y31, respectively. However, this is just an example, and embodiments are not limited thereto. The first user equipment UE1 may sum the values of the first time parameter, which respectively correspond to the first to third widths W13, W23, and W33, and sum the values of the second time parameter, which respectively correspond to the first to third widths W13, W23, and W33, and respectively set the first and second time parameters to the sum values.

Figure 12A:
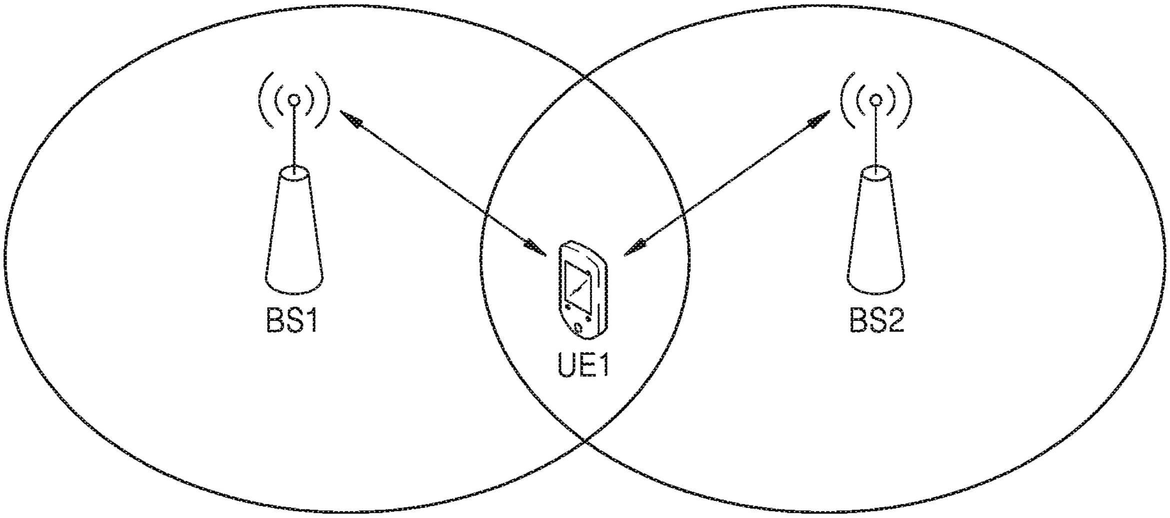
FIG. 12A is a diagram of a wireless system, in which cell-specific reference signal interference cancellation (CRS-IC or CRSIC) is activated, according to an example embodiment.
Figure 12B:
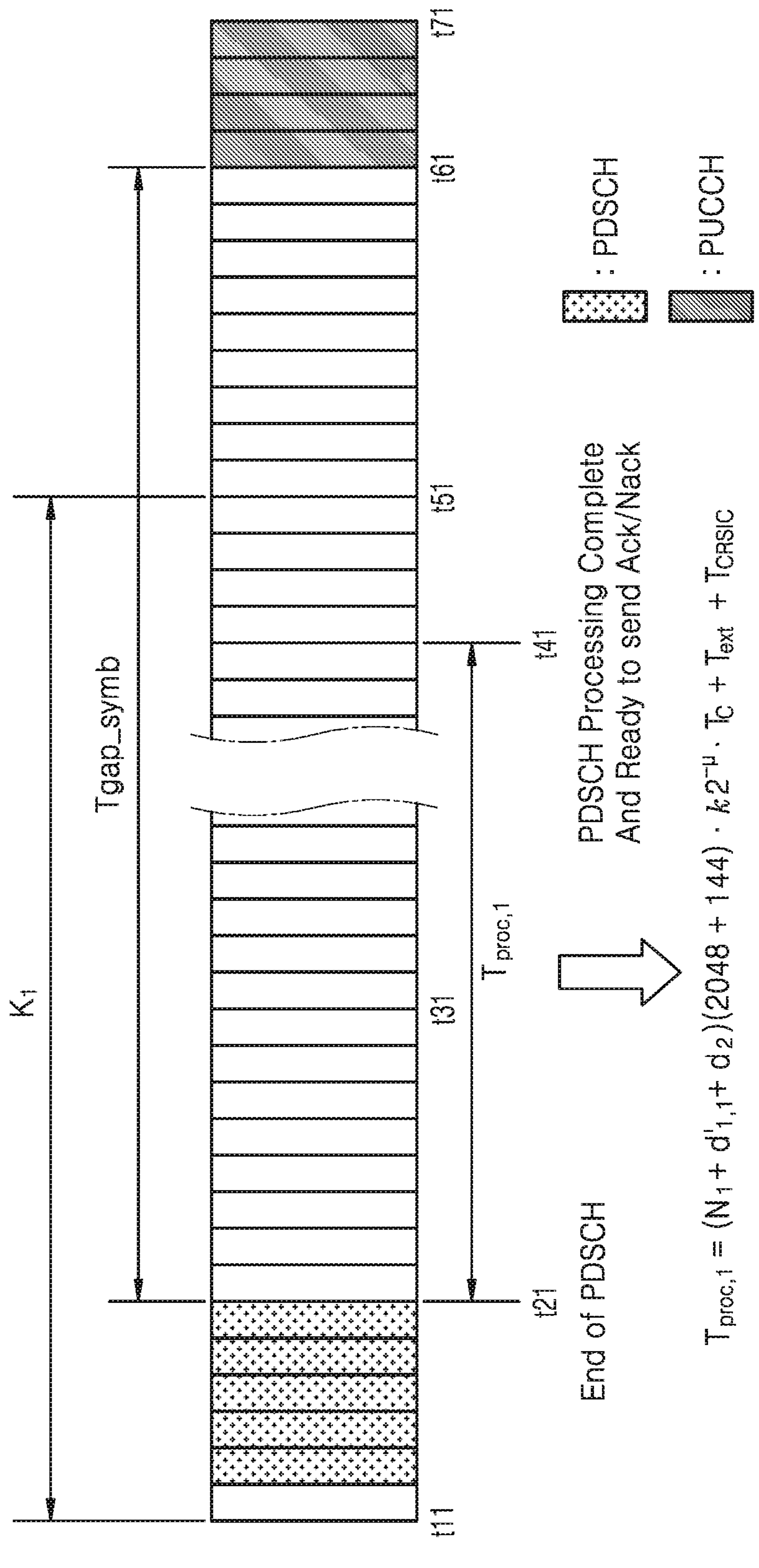
FIG. 12B is a diagram of a method of calculating a PDSCH processing time, taking into account the CRS-IC, according to an example embodiment.

FIG. 12A is a diagram of a wireless system, in which CRS-IC is activated, according to an example embodiment. FIG. 12B is a diagram of a method of calculating a PDSCH processing time $T_{proc,1}$, taking into account the CRS-IC, according to an example embodiment. FIG. 12C is a table of third and fourth time parameters in FIG. 12B.

Referring to FIG. 12A, the wireless system may include the first user equipment UE1 and the first and second base stations BS1 and BS2. CRS-IC may be activated in the wireless system, the first base station BS1 may transmit a 5G mobile network-based PDSCH to the first user equipment UE1, and the second base station BS2 may transmit an LTE mobile network-based CRS to the first user equipment UE1. The first user equipment UE1 may communicate with the first base station BS1 based on a 5G mobile network. At this time, for the first user equipment UE1, a CRS received from the second base station BS2 may be noise that should be removed.

In an example embodiment, the first user equipment UE1 may cancel interference by the CRS and decode a received PDSCH. In other words, the PDSCH processing time of the first user equipment UE1 may include a time required to cancel the interference by the CRS and a time required to decode the PDSCH.

Referring further to FIG. 12B, the first base station BS1 may determine the Ack/Nack timing $K_1$ and the symbol reference time gap Tgap_symb based on a PDSCH processing time $T_{proc,1}$ of the first user equipment UE1. Hereinafter, redundant descriptions of FIG. 6B are omitted.

In an example embodiment, the PDSCH processing time $T_{proc,1}$ of the first user equipment UE1 may be calculated using Equation 4.

[Equation 4]

$$T_{proc,1} = (N_1 + d'_{1,1} + d_2)(2048 + 144)\cdot\kappa 2^{-\mu}\cdot T_C + T_{ext} + T_{CRSIC},$$

$$d'_{1,1} = d_{1,1} + Y$$

$T_{proc,1}$ is described in detail in section 5.3 of 3GPP TS 38.214. Hereinafter, third and fourth time parameters according to example embodiments are mainly described.

In an example embodiment, at least one time parameter is set to at least one value corresponding to a time required to cancel interference by a CRS and may include a third time parameter and a fourth time parameter. The third time parameter may be $T_{CRSIC}$ and the fourth time parameter may be Y added to $d_{1,1}$. In some embodiments, the at least one time parameter may include only one of the third and fourth time parameters $T_{CRSIC}$ and Y. In this regard, $T_{proc,1}$ may be calculated using Equation 5 or Equation 6.

[Equation 5]

$$T_{proc,1} = (N_1 + d_{1,1} + d_2)(2048 + 144)\cdot\kappa 2^{-\mu}\cdot T_C + T_{ext} + T_{CRSIC}$$

[Equation 6]

$$T_{proc,1} = (N_1 + d_{1,1} + d_2(2048 + 144)\cdot\kappa 2^{-\mu}\cdot T_C + T_{ext},$$

$$d'_{1,1} = d_{1,1} + Y$$

Equation 5 corresponds to an embodiment of calculating a processing time, taking into account only the third time parameter $T_{CRSIC}$, and Equation 6 corresponds to an embodiment of calculating a processing time, taking into account only the fourth time parameter Y. Hereinafter, an embodiment of calculating a processing time, taking into account the third and fourth time parameters $T_{CRSIC}$ and Y, is mainly described, but embodiments are not limited thereto. The processing time may be calculated taking into account only one of the third and fourth time parameters $T_{CRSIC}$ and Y.

Referring to FIG. 12C, the third time parameter $T_{CRSIC}$ may be set to a value X2, and the second time parameter Y may be set to a value Y2. In an example embodiment, the values X2 and Y2 may be fixed values obtained in advance. In other words, when CRS-IC is activated, the first user equipment UE1 may set, in response to the activation of CRS-IC, the third time parameter $T_{CRSIC}$ to the value X2 and the second time parameter Y to the value Y2 and calculate the processing time $T_{proc,1}$ using Equation 4.

In an example embodiment, the values X2 and Y2 may be variable. For example, a UE may adjust the values X2 and Y2 based on a slot configuration. The UE may adjust the values X2 and Y2 based on a subcarrier interval or the number of symbols included in a slot. For example, the UE may adjust the values X2 and Y2 based on the number of CRSs overlapping with a data frequency region allocated to a PDSCH. As the number of CRSs overlapping with the data frequency region increases, the PDSCH processing time of the UE may also increase. The values X2 and Y2 used to determine a PDSCH processing time may vary with a slot configuration. The details thereof may be defined as standards in 3GPP TS 38.214 or the like.

Figure 13:
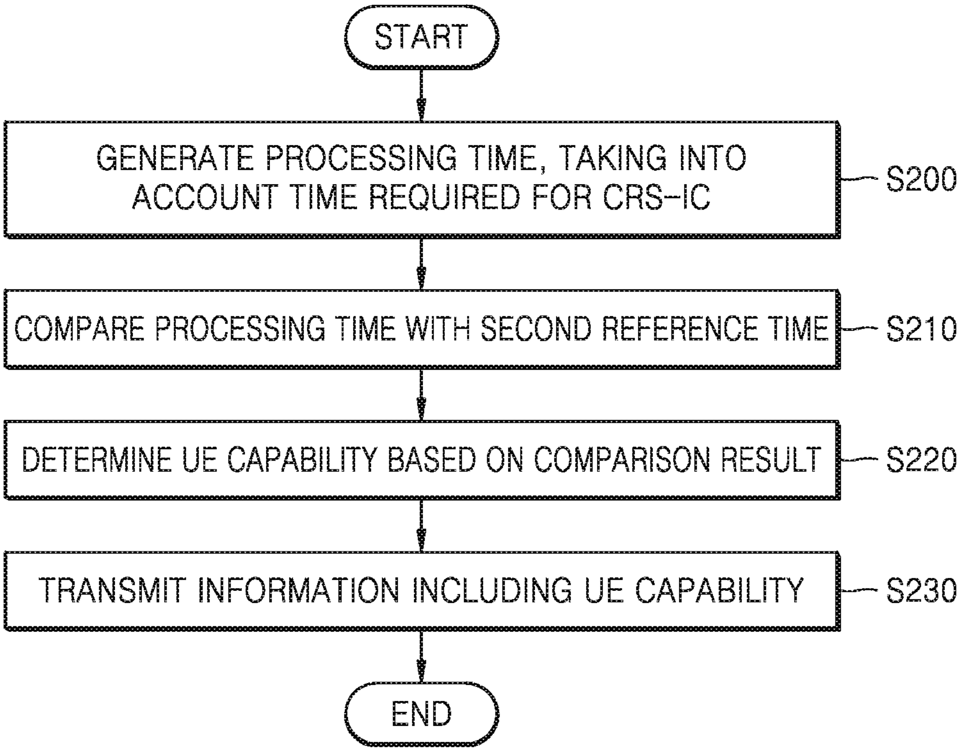
FIG. 13 is a flowchart of an operating method of a UE, according to an example embodiment.

FIG. 13 is a flowchart of an operating method of a UE, according to an example embodiment.

Referring to FIG. 13, the UE may determine a PDSCH processing time, taking into account a time required for CRS-IC, in operation S200. The UE may determine the PDSCH processing time, taking into account a time required for CRS-IC and a time required to decode a PDSCH. The UE may compare the PDSCH processing time with a second reference time in operation S210. The second reference time when the CRS-IC is activated may have a predetermined value and may be different from a second reference time when the CRS-IC is inactivated. For example, the second reference time when the CRS-IC is activated may be longer than the second reference time when the CRS-IC is inactivated. The UE may determine the capability thereof based on a comparison result in operation S220. For example, the UE may determine that the capability thereof is a first level capability, e.g., satisfactory or good, when the PDSCH processing time is shorter than the second reference time and set the capability thereof to a first value indicating the first level capability. The UE may determine that the capability thereof is a second level capability, e.g., poor or unsatisfactory when the PDSCH processing time is longer than or equal to the second reference time and set the capability thereof to a second value indicating the second level capability. The UE may transmit information including the capability thereof to a base station in operation S230. The base station may perform scheduling on the downlink and uplink to the UE based on the capability of the UE included in the received information.

Figure 14A:
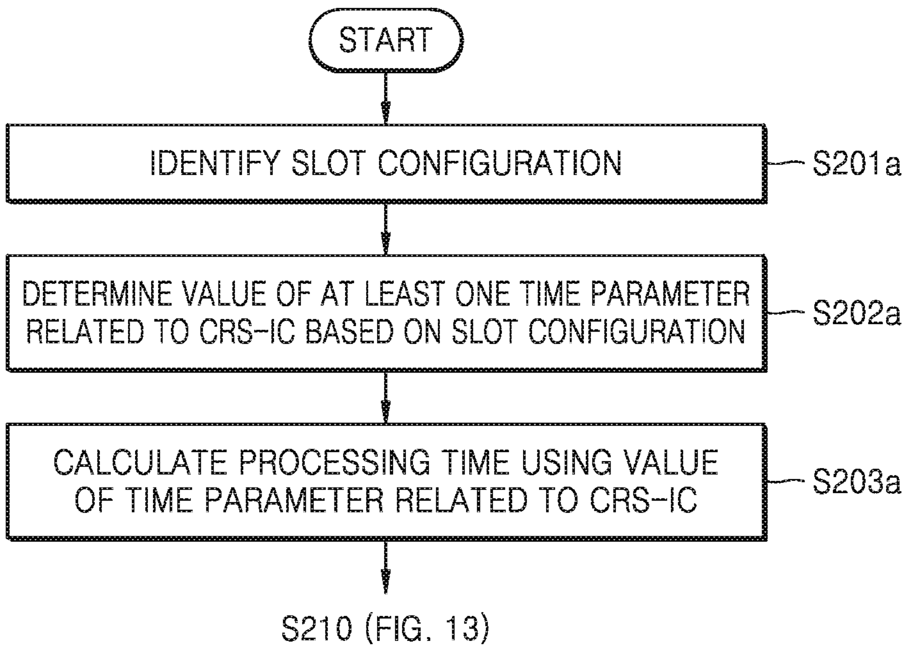
FIG. 14A is a detailed flowchart of operation S200 in FIG. 13.

FIG. 14A is a detailed flowchart of operation S200 in FIG. 13. FIG. 14B is a table showing third and fourth time parameters with respect to a slot configuration, according to an example embodiment.

Referring to FIG. 14A, the UE may identify a slot configuration in 5G mobile network-based communication in operation S201*a*. The slot configuration may be defined by a subcarrier interval and/or the number of symbols included in a slot. The UE may determine a value of at least one time parameter related to the CRS-IC based on the slot configuration in operation S202*a*.

Referring to FIG. 14B, the time parameter related to the CRS-IC may include third and fourth time parameters, and respective values of the third and fourth time parameters may be differently set according to the slot configuration. The table of FIG. 14B may be obtained in advance and defined as a standard. In an example embodiment, when the slot configuration corresponds to a first slot configuration CONFIG. 1, the third and fourth time parameters may be respectively set to values X12 and Y12. When the slot configuration corresponds to a second slot configuration CONFIG. 2, the third and fourth time parameters may be respectively set to values X22 and Y22. When the slot configuration corresponds to a third slot configuration CONFIG. 3, the third and fourth time parameters may be respectively set to values X32 and Y32. As described above, the values of the third and fourth time parameters corresponding to each of a plurality of slot configurations may be obtained in advance.

Returning to FIG. 14A, the UE may determine, based on the table of FIG. 14B, the values of the third and fourth time parameters related to the CRS-IC in operation S202*a*. The UE may calculate the PDSCH processing time using the value of the time parameter related to the CRS-IC in operation S203*a*. Thereafter, operation S210 (in FIG. 13) is performed.

Figure 15:
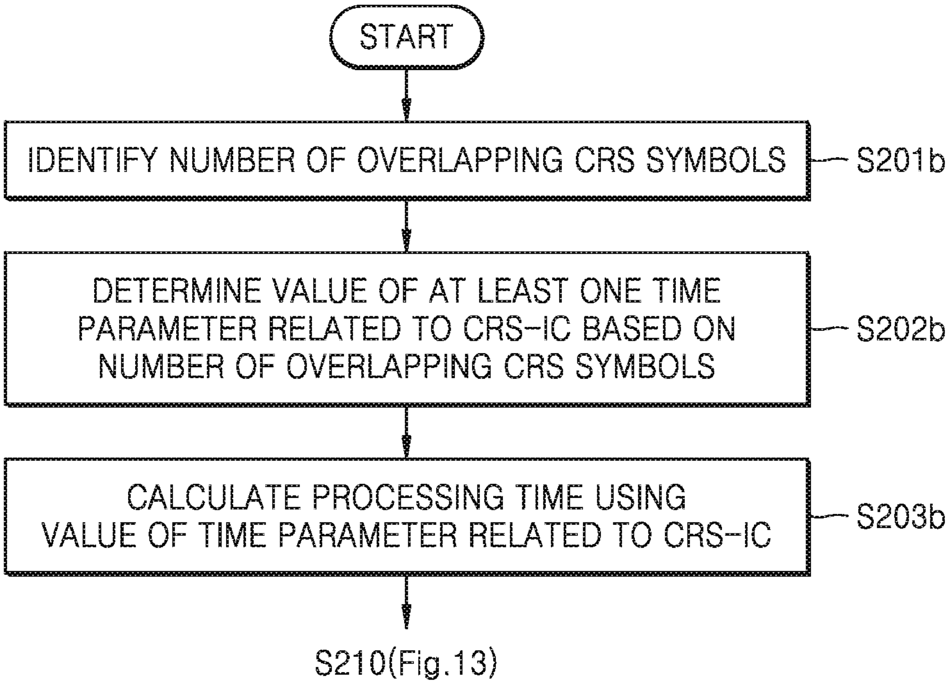
FIG. 15 is a detailed flowchart of operation S200 in FIG. 13.

FIG. 15 is a detailed flowchart of operation S200 in FIG. 13.

Referring to FIG. 15, the UE may identify the number of CRS symbols overlapping with a data frequency region allocated to a PDSCH in operation S201*b*. In an example embodiment, the UE may identify the number of overlapping CRS symbols based on the number of antenna ports related to a CRS and the type of a frame including the CRS. The UE may determine a value of at least one time parameter related to the CRS-IC based on the number of overlapping CRS symbols in operation S202*b*. The UE may calculate the PDSCH processing time using the value of the time parameter related to the CRS-IC in operation S203*b*. Thereafter, operation S210 (in FIG. 13) is performed.

Figure 16A:
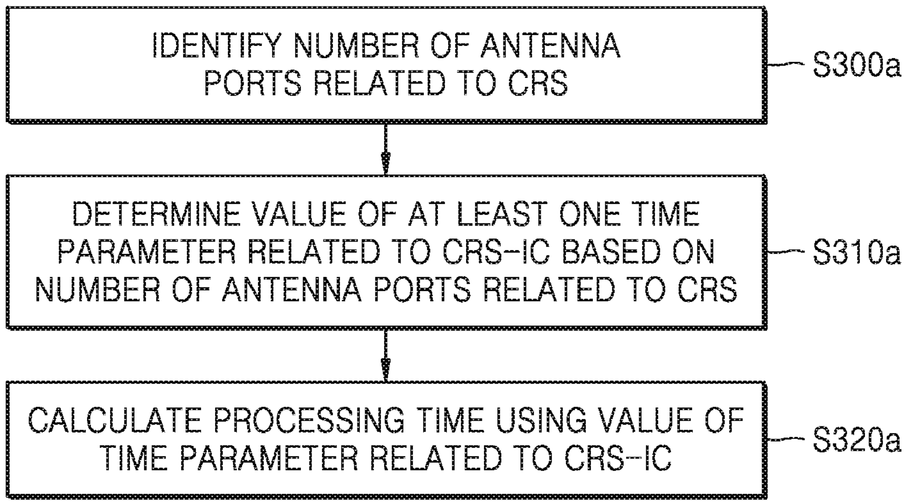
FIG. 16A is a flowchart of an operating method of a UE, according to an example embodiment.
Figure 16B:
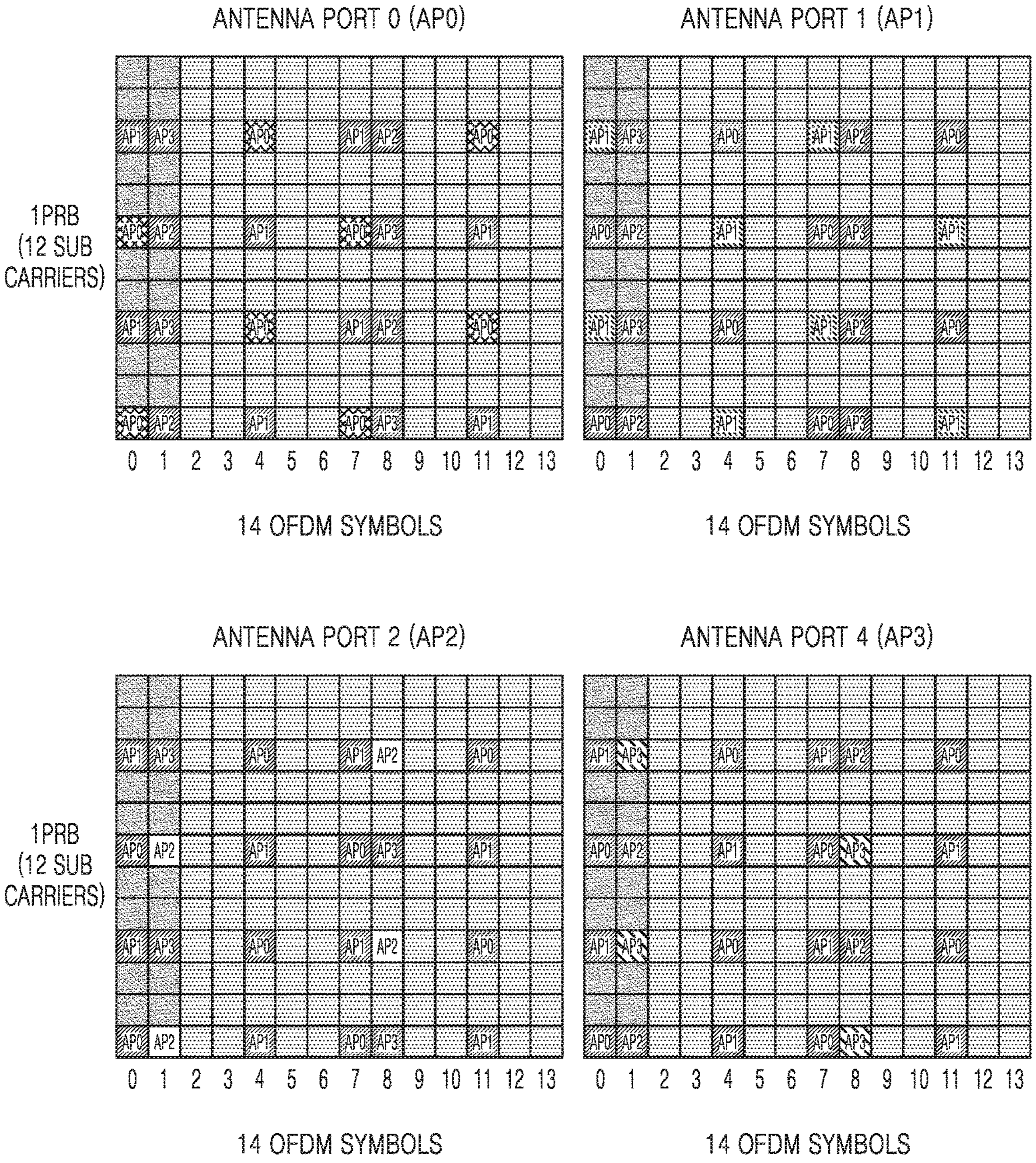
FIG. 16B is a diagram of the numbers of overlapping CRSs with respect to the numbers of antenna ports.

FIG. 16A is a flowchart of an operating method of a UE, according to an example embodiment. FIG. 16B is a diagram of the numbers of overlapping CRSs with respect to the numbers of antenna ports. FIG. 16B is described assuming a single physical resource block (PRB) including 12 subcarriers and 14 OFDM symbols. However, this is just an example, and embodiments are not limited thereto.

Referring to FIG. 16A, a UE may identify the number of antenna ports related to a CRS in operation S300*a*. The number of CRSs overlapping with a data frequency region allocated to a PDSCH of the UE may vary with the number of antenna ports related to a CRS. Accordingly, the UE may substantially identify the number of CRSs overlapping with the data frequency region based on the number of antenna ports related to a CRS.

Referring further to FIG. 16B, when the number of antenna ports is 0, eight CRSs AP0 may be allocated to a single PRB and transmitted to the UE. When the number of antenna ports is 1, eight CRSs AP1 may be allocated to a single PRB and transmitted to the UE. When the number of antenna ports is 2, four CRSs AP2 may be allocated to a single PRB and transmitted to the UE. When the number of antenna ports is 3, four CRSs AP3 may be allocated to a single PRB and transmitted to the UE. In other words, the number of CRSs allocated to a single PRB may vary with the number of antenna ports. This may be related to the number of CRSs overlapping with the data frequency region.

Returning to FIG. 16A, the UE may determine at least one value of at least one time parameter related to the CRS-IC based on the number of antenna ports in operation S310*a*. For example, the at least one value of the at least one time parameter when the number of antenna ports is 2 or 3 may be less than the value of the time parameter when the number of antenna ports is 0 or 1, or vice versa. The UE may calculate the PDSCH processing time using the value of the time parameter related to the CRS-IC in operation S320*a*.

Figure 17A:
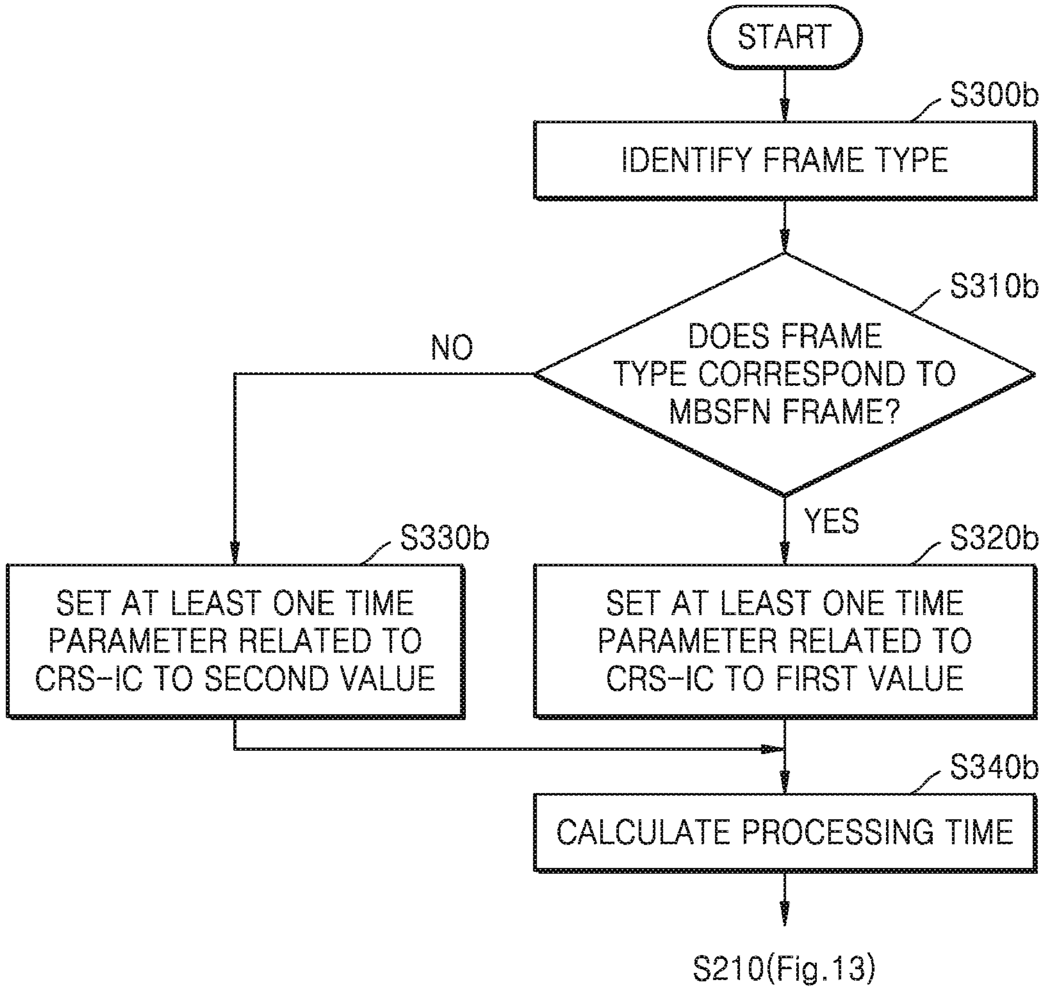
FIG. 17A is a flowchart of an example of the operating method of FIG. 15.
Figure 17B:
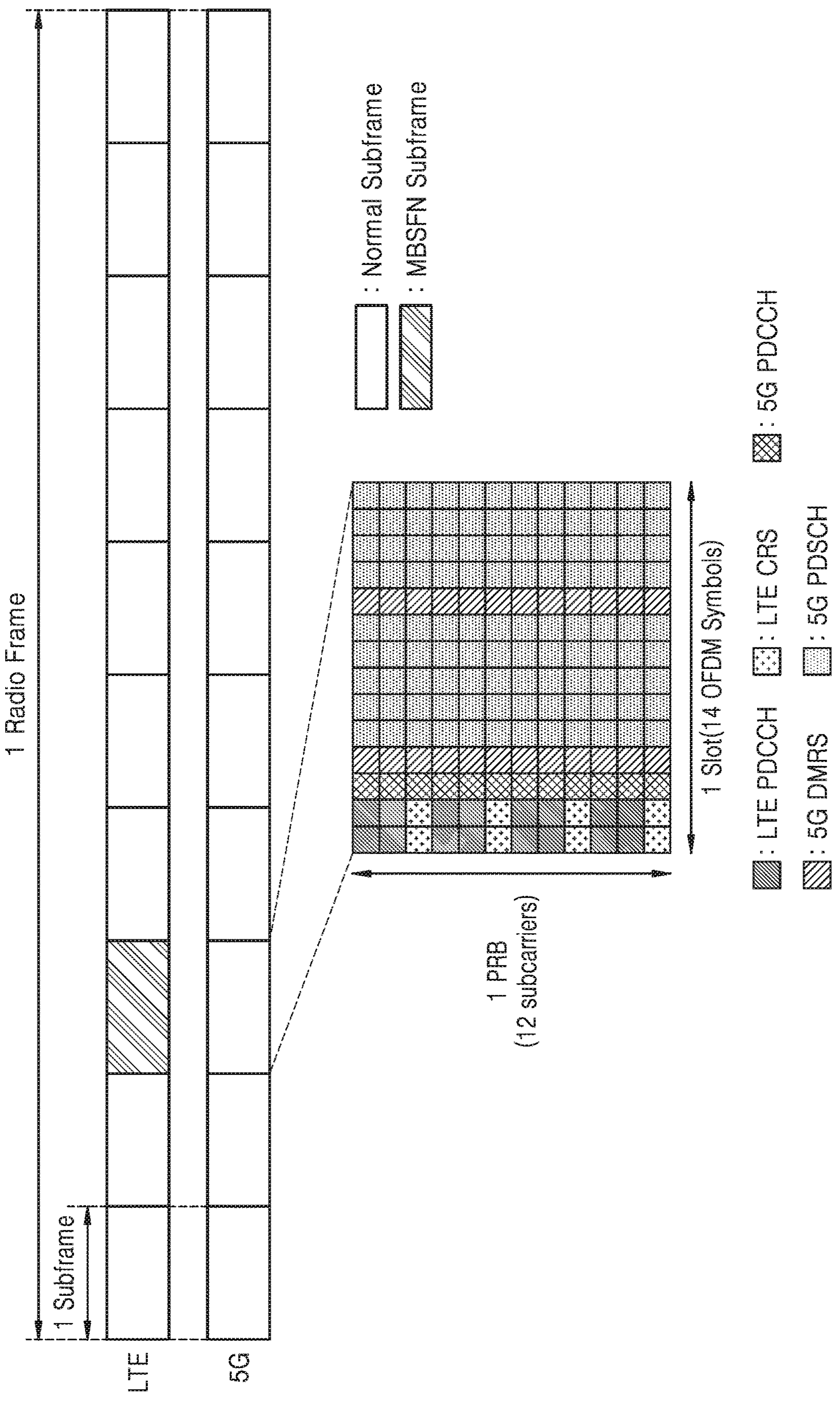
FIGS. 17B and 17C are diagrams of the numbers of overlapping CRSs with respect to frame types.
Figure 17C:
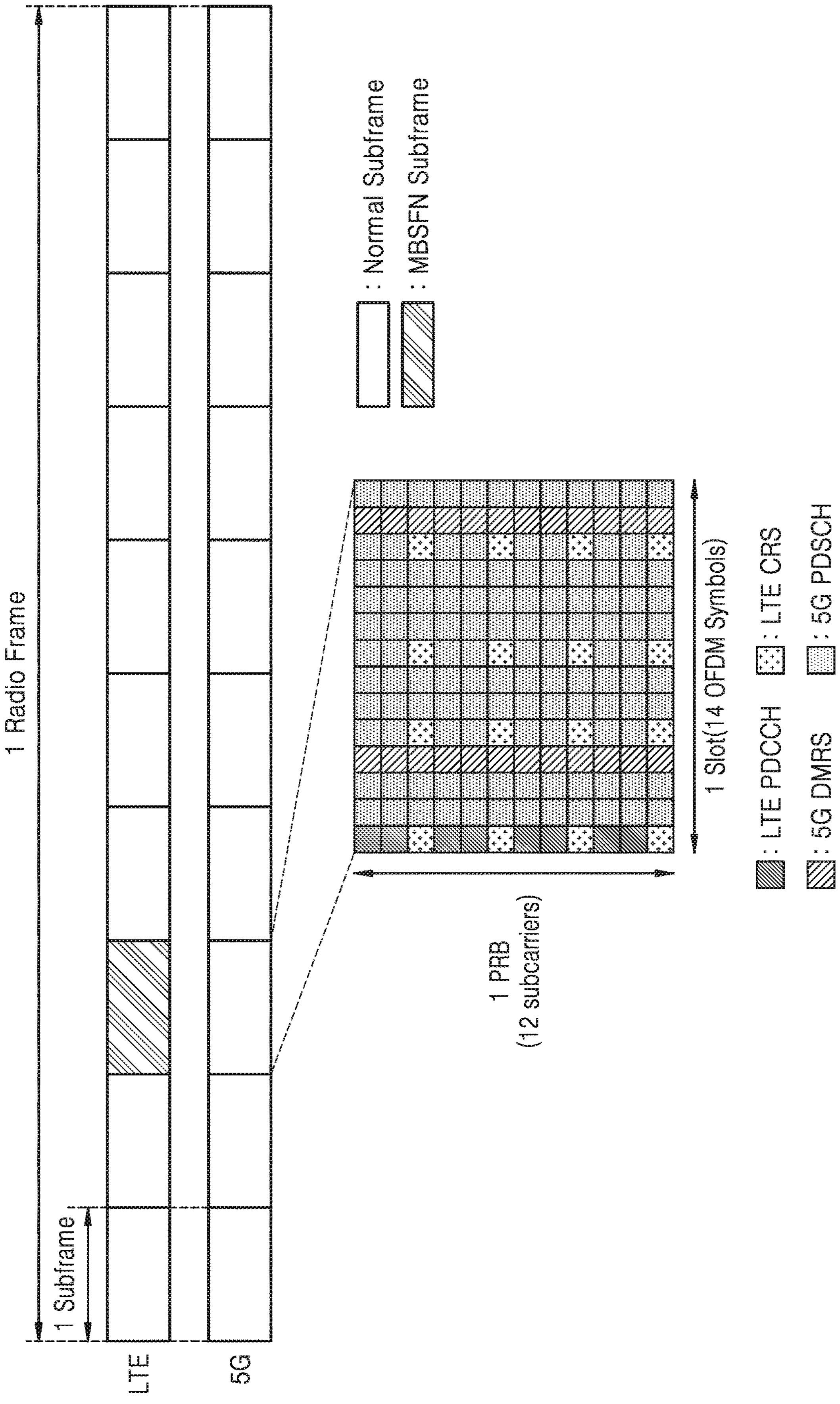

FIG. 17A is a flowchart of an example of the operating method of FIG. 15. FIGS. 17B and 17C are diagrams of the numbers of overlapping CRSs with respect to frame types. FIG. 17B is described assuming that a single PRB includes 12 subcarriers and 14 OFDM symbols and that the length of a slot is equal to the length of a subframe. However, this is just an example, and embodiments are not limited thereto.

Referring to FIG. 17A, the UE may identify the type of a frame including a CRS in operation S300*b*. For example, the type of a frame including a CRS may be classified as a normal frame or a multimedia broadcast multicast service single frequency network (MBSFN) frame. The number of CRSs overlapping with a data frequency region allocated to a PDSCH of the UE may vary with a frame type. Accordingly, the UE may substantially identify the number of CRSs overlapping with the data frequency region based on the frame type.

Referring further to FIG. 17B, when the type of a frame including a CRS corresponds to an MBSFN frame, eight LTE mobile network-based CRSs (i.e. eight LTE CRSs) may be allocated to first two symbols.

Referring further to FIG. 17C, when the type of a frame including a CRS corresponds to a normal frame, 16 LTE CRSs may be allocated to symbols at certain symbol intervals. In other words, the number of CRSs included in a single PRB of an MBSFN frame may be less than the number of CRSs included in a single PRB of a normal frame. That is, the number of CRSs allocated to a single PRB may vary with a frame type, and this fact may be related to the number of CRSs overlapping with a data frequency region.

Returning to FIG. 17A, the UE may determine whether the frame type corresponds to an MBSFN frame in operation S310*b*. In case of YES in operation S310*b*, the UE may set at least one time parameter related to CRS-IC to a first value in operation S320*b*. In case of NO in operation S310*b*, the UE may set the time parameter related to CRS-IC to a second value in operation S330*b*. For example, the first value may be less than the second value. The UE may calculate the PDSCH processing time using the time parameter having the set value in operation S340*b*. Thereafter, operation S210 in FIG. 13 may be performed.

Figure 18:
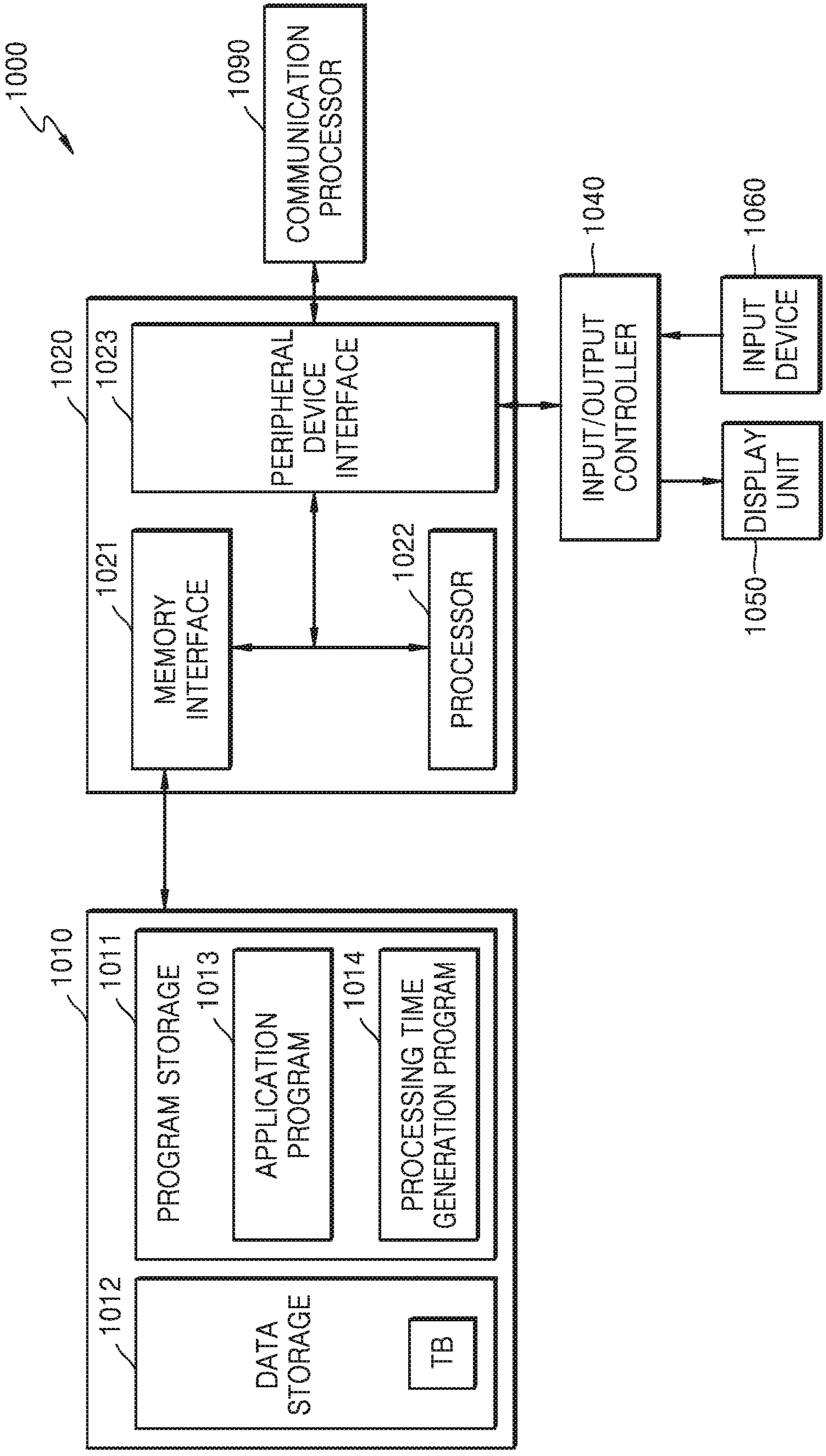
FIG. 18 is a block diagram of an electronic apparatus according to an example embodiment.

FIG. 18 is a block diagram of an electronic apparatus 1000 according to an example embodiment.

Referring to FIG. 18, the electronic apparatus 1000 may include a memory 1010, a processor unit 1020, an input/output controller 1040, a display unit 1050, an input device 1060, and a communication processor 1090. There may be a plurality of memories 1010. Each element will be described below.

The memory 1010 may include a program storage 1011, which stores a program for controlling an operation of the electronic apparatus 1000, and a data storage 1012, which stores data generated during execution of the program. The data storage 1012 may store data necessary for the operation of an application program 1013 and the operation of a processing time generation program 1014. In an example embodiment, the data storage 1012 may store a table TB of values of time parameters necessary to determine a PDSCH processing time. For example, the table TB may comply with standards disclosed in 3GPP TS 38.214 or the like.

The program storage 1011 may include the application program 1013 and the processing time generation program 1014. At this time, a program included in the program storage 1011 may be a set of instructions and expressed as an instruction set. The application program 1013 may include program code for executing various applications run by the electronic apparatus 1000. In other words, the application program 1013 may include code (or commands) related to various applications run by the processor 1022. The processing time generation program 1014 may include control code for generating a PDSCH processing time, according to example embodiments. In an example embodiment, the processor 1022 may set at least one value of at least one time parameter based on a function activated in a 5G mobile network and determine a PDSCH processing time using the value, by executing the processing time generation program 1014.

The communication processor 1090 of the electronic apparatus 1000 may perform communication functions for voice communication and data communication. The processor 1022 may receive a 5G mobile network-based PDSCH and an MBS-related PDSCH or an LTE mobile network-based CRS from a base station through the communication processor 1090.

A peripheral device interface 1023 may control connection among the input/output controller 1040, the communication processor 1090, the processor 1022, and a memory interface 1021. The processor 1022 may control a plurality of base stations to provide a service using at least one software program. At this time, the processor 1022 may execute at least one program stored in the memory 1010 to provide a service corresponding to the program.

The input/output controller 1040 may provide an interface between an input/output device, such as the display unit 1050 or the input device 1060, and the peripheral device interface 1023. The display unit 1050 displays status information, input text, a moving picture, and/or a still picture. For example, the display unit 1050 may display information about an application program run by the processor 1022.

The input device 1060 may provide input data, which is generated by the selection of the electronic apparatus 1000, to the processor unit 1020 through the input/output controller 1040. At this time, the input device 1060 may include a keypad, which includes at least one hardware button, and/or a touch pad sensing touch information. For example, the input device 1060 may provide touch information, such as a touch, a movement of the touch, or the release of the touch, which is detected through a touch pad, to the processor 1022 through the input/output controller 1040.

Figure 19:
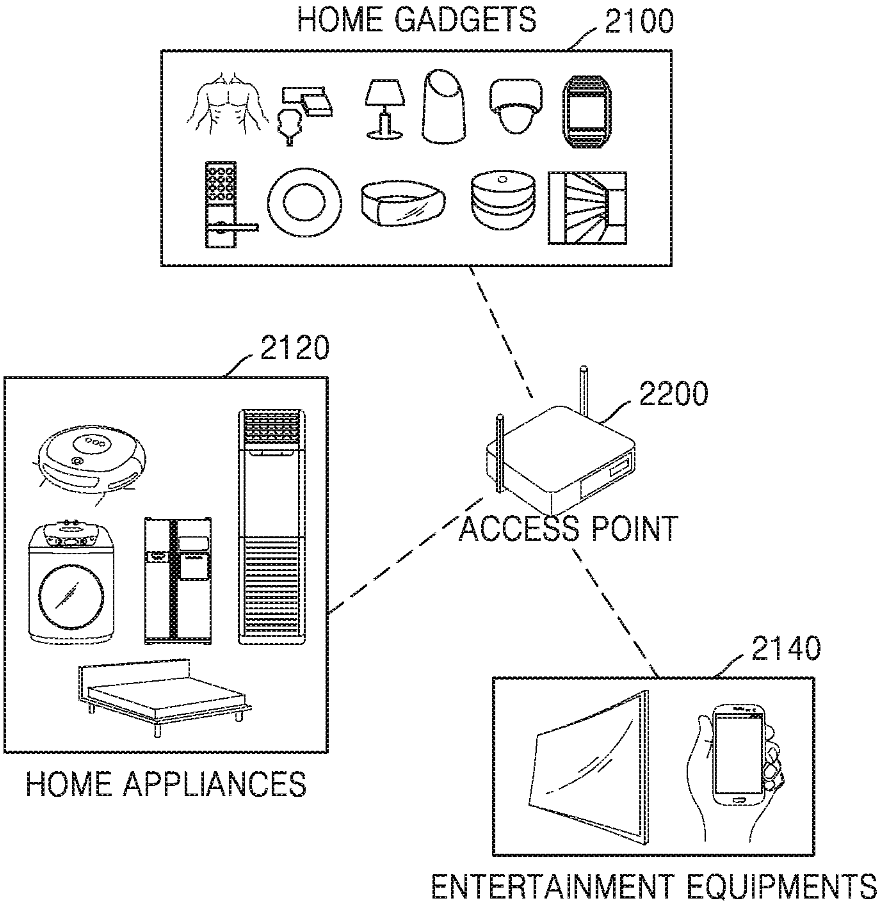
FIG. 19 is a diagram of communication equipments generating a PDSCH processing time, according to an example embodiment.

FIG. 19 is a diagram of communication equipments generating a PDSCH processing time, according to an example embodiment.

Referring to FIG. 19, home gadgets 2100, home appliances 2120, entertainment equipments 2140, and an access point (AP) 2200 may each determine a PDSCH processing time and determine the capability thereof, according to embodiments. The determined capability may be used to configure a communication network. In some embodiments, the home gadgets 2100, the home appliances 2120, the entertainment equipments 2140, and the AP 2200 may constitute an Internet of things (IoT) network. The communication equipments illustrated in FIG. 19 are just examples, and example embodiments may also applied to other communication equipments than those illustrated in FIG. 19.

While the inventive concept has been particularly shown and described with reference to embodiments thereof, it will be understood that various changes in form and details may be made therein without departing from the spirit and scope of the following claims.

What is claimed is:

1. An operating method of a user equipment communicating with a base station in a fifth-generation (5G) mobile network, the operating method comprising:

setting at least one value of at least one time parameter based on a network state corresponding to at least one activated function in the 5G mobile network;

determining a processing time for a physical downlink shared channel (PDSCH) from the base station based on the at least one value of at least one time parameter;

determining a capability of the user equipment by comparing the processing time with a reference time; and transmitting information including the capability of the user equipment to the base station, wherein the reference time when the at least one activated function supported by the 5G mobile network is multicast and broadcast services (MBS) is different from the reference time when the function supported by the 5G mobile network is cell-specific reference signal interference cancellation (CRS-IC).

2. The operating method of claim 1, wherein the at least one activated function includes at least one of multicast and broadcast services (MBS) and cell-specific reference signal interference cancellation (CRS-IC).

3. The operating method of claim 1, wherein:

the at least one activated function is multicast and broadcast services (MBS);

the PDSCH is a global PDSCH, the global PDSCH including a first PDSCH for the MBS and a second PDSCH based on unicast or group cast; and the setting of the at least one value is based at least in part on an overlap pattern between a common frequency region allocated to the first PDSCH and a data frequency region allocated the second PDSCH.

4. The operating method of claim 1, wherein:

the base station is a first base station;

the activated function is cell-specific reference signal interference cancellation (CRS-IC); and the setting of the at least one value is based at least in part on a number of CRSs based on a long-term evolution (LTE) mobile network, the CRSs being received from a second base station and overlapping with a data frequency region allocated to the PDSCH.

5. The operating method of claim 1, wherein the at least one time parameter is set to at least one predetermined value corresponding to a function supported by the 5G mobile network.

6. The operating method of claim 1, wherein the reference time is a first reference time different from a second reference time when the activated function is inactivated.

7. The operating method of claim 1, wherein the processing time includes a time required for a processing operation corresponding to the activated function.

8. An operating method of a user equipment communicating with a base station in a fifth-generation (5G) mobile network, the operating method comprising:

setting at least one time parameter to at least one value corresponding to a time required to process multicast and broadcast services (MBS)-related data in the 5G mobile network;

determining a processing time for a physical downlink shared channel (PDSCH) reflecting the at least one value of the at least one time parameter;

determining a capability of the user equipment based by comparing the processing time with a reference time; and transmitting information including the capability of the user equipment to the base station, wherein the reference time corresponds to an activated MBS function in the 5G mobile network.

9. The operating method of claim 8, wherein the PDSCH is a global PDSCH, the global PDSCH including a first PDSCH for MBS and a second PDSCH based on unicast or group cast.

10. The operating method of claim 9, wherein the setting of the at least one time parameter is based at least in part on a number of common frequency regions allocated to the first PDSCH, the common frequency regions overlapping with a data frequency region allocated to the second PDSCH.

11. The operating method of claim 10, wherein the at least one value is positively correlated with the number of common frequency regions.

12. The operating method of claim 9, wherein the setting of the at least one time parameter includes setting the at least one time parameter based on a frequency-axis width of an overlapping region between a data frequency region allocated to the second PDSCH and a common frequency region allocated to the first PDSCH.

13. The operating method of claim 9, wherein the setting of the at least one time parameter is based on whether there is an overlap between a data frequency region allocated to the second PDSCH and a common frequency region allocated to the first PDSCH.

14. An operating method of a user equipment communicating with a first base station based on a fifth-generation (5G) mobile network, the operating method comprising:

setting at least one time parameter to a value corresponding to a time required to cancel interference by a cell-specific reference signal (CRS) received from a second base station;

generating a processing time for a physical downlink shared channel (PDSCH) reflecting the value of the at least one time parameter;

determining a capability of the user equipment based on the processing time; and transmitting information including the capability of the user equipment to the first base station.

15. The operating method of claim 14, wherein the setting of the at least one time parameter is based at least in part on a slot configuration of the PDSCH.

16. The operating method of claim 15, wherein the slot configuration relates to at least one of a subcarrier interval of the PDSCH and a number of symbols included in a slot.

17. The operating method of claim 16, further comprising cancelling the interference by the CRS using a method selected based on the at least one of the subcarrier interval and the number of symbols.

18. The operating method of claim 14, wherein the setting of the at least one time parameter includes setting the at least one time parameter based on a number of CRSs overlapping with a data frequency region allocated the PDSCH.

19. The operating method of claim 14, wherein the setting of the at least one time parameter includes setting the at least one time parameter based on whether a frame including the CRS includes a multimedia broadcast multicast service single frequency network (MBSFN) frame.

* * * * *